(12) United States Patent
Carr et al.

(10) Patent No.: US 11,906,274 B2
(45) Date of Patent: Feb. 20, 2024

(54) RECONNAISSANCE AND COMMUNICATION ASSEMBLY

(71) Applicant: BAE SYSTEMS plc, London (GB)

(72) Inventors: Andrew Michael Carr, Portsmouth (GB); Timothy Keith Girling, Portsmouth (GB); Murray Thomson, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 123 days.

(21) Appl. No.: 17/753,388

(22) PCT Filed: Aug. 20, 2020

(86) PCT No.: PCT/GB2020/051993
§ 371 (c)(1),
(2) Date: Mar. 1, 2022

(87) PCT Pub. No.: WO2021/044118
PCT Pub. Date: Mar. 11, 2021

(65) Prior Publication Data
US 2022/0316847 A1   Oct. 6, 2022

(30) Foreign Application Priority Data

Sep. 4, 2019 (GB) ........................ 1912696
Jul. 16, 2020 (GB) ........................ 2010979

(51) Int. Cl.
F42B 12/36    (2006.01)
B64C 39/02    (2023.01)
(Continued)

(52) U.S. Cl.
CPC .......... *F42B 12/365* (2013.01); *B63B 22/003* (2013.01); *B63G 1/00* (2013.01);
(Continued)

(58) Field of Classification Search
CPC ........ F42B 12/365; F42B 10/56; F42B 15/10; B63B 22/003; B63G 1/00; B63G 6/00;
(Continued)

(56) References Cited

U.S. PATENT DOCUMENTS 3,248,688 A    4/1966    Shomphe
3,567,163 A    3/1971    Kepp
(Continued)

FOREIGN PATENT DOCUMENTS

DE    4104800 A1    8/1992
DE    102007048073 A1    4/2009
(Continued)

OTHER PUBLICATIONS

International Search Report and Written Opinion received for PCT Application No. PCT/GB2020/051993, dated Dec. 17, 2020. 12 pages.
(Continued)

*Primary Examiner* — Samir Abdosh
(74) *Attorney, Agent, or Firm* — Finch & Maloney PLLC

(57) ABSTRACT

According to a first aspect of the present invention, there is provided a reconnaissance and communication assembly, adapted to be launched from a gun barrel into the air. The assembly comprises a carrier (with a cavity) and a payload (within the cavity). The payload is arranged to be controllably expelled from the carrier and once expelled from the carrier, the payload transmits a signal.

20 Claims, 23 Drawing Sheets

(51) Int. Cl.
*H04K 3/00* (2006.01)
*B63B 22/00* (2006.01)
*B63G 1/00* (2006.01)
*F42B 10/56* (2006.01)
*F42B 15/10* (2006.01)
*B63G 6/00* (2006.01)
*B63G 9/00* (2006.01)
*B64U 70/00* (2023.01)
*B64U 101/20* (2023.01)

(52) U.S. Cl.
CPC ............ *B64C 39/024* (2013.01); *F42B 10/56* (2013.01); *F42B 15/10* (2013.01); *H04K 3/62* (2013.01); *H04K 3/825* (2013.01); *B63G 6/00* (2013.01); *B63G 2009/005* (2013.01); *B64U 70/00* (2023.01); *B64U 2101/20* (2023.01); *H04K 2203/22* (2013.01)

(58) Field of Classification Search
CPC .. B63G 2009/005; B64C 39/024; H04K 3/63; H04K 3/825; H04K 2203/22; B64U 2101/02
USPC ........................................................ 102/517
See application file for complete search history.

(56) References Cited

U.S. PATENT DOCUMENTS

| | | | |
|---|---|---|---|
| 5,214,618 A | 5/1993 | Bugiel | |
| 6,392,213 B1 | 5/2002 | Martorana et al. | |
| 7,353,598 B2 | 4/2008 | Craig et al. | |
| 8,115,149 B1* | 2/2012 | Manole | F42B 10/18 244/45 R |
| 9,068,807 B1 | 6/2015 | Thomas et al. | |
| 9,140,528 B1 | 9/2015 | Thomas et al. | |
| 10,619,983 B2 | 4/2020 | Crouch et al. | |
| 10,703,451 B1* | 7/2020 | Adams | F41F 3/10 |
| 11,170,639 B2 | 11/2021 | Wickramarathne et al. | |
| 11,255,643 B2 | 2/2022 | Ang et al. | |
| 11,326,863 B2 | 5/2022 | Rami | |
| 11,358,687 B1* | 6/2022 | Barnawi | G01S 7/52004 |
| 11,465,741 B2 | 10/2022 | Smith et al. | |
| 11,472,550 B2 | 10/2022 | Smith et al. | |
| 11,619,475 B2 | 4/2023 | Carr et al. | |
| 11,697,497 B2 | 7/2023 | Smith et al. | |
| 11,821,716 B2 | 11/2023 | Carr et al. | |
| 2011/0036999 A1* | 2/2011 | Bradley | H04K 3/62 250/492.1 |
| 2016/0236638 A1* | 8/2016 | Lavie | G08G 1/012 |
| 2022/0325995 A1 | 10/2022 | Carr et al. | |

FOREIGN PATENT DOCUMENTS

| | | | |
|---|---|---|---|
| EP | 0466499 A1 | 1/1992 | |
| EP | 0800052 A2 | 10/1997 | |
| EP | 2871438 A1 | 5/2015 | |
| FR | 2726643 A1 | 5/1996 | |
| GB | 2320556 A | 6/1998 | |
| JP | 6228052 B2 | 11/2017 | |
| WO | WO-2007012148 A1 * | 2/2007 | ............. F42B 12/36 |
| WO | 2015147970 A1 | 10/2015 | |
| WO | 2020128437 A2 | 6/2020 | |
| WO | 2020128454 A1 | 6/2020 | |
| WO | 2021034424 A2 | 2/2021 | |
| WO | 2021044118 A1 | 3/2021 | |
| WO | 2021044119 A1 | 3/2021 | |

OTHER PUBLICATIONS

Combined Search and Examination Report under Sections 17 and 18(3) received for GB Application No. 12010979.9, dated Dec. 14, 2020. 6 pages.
Australian Examination Report received for AU Application No. 2020342607, dated Jul. 4, 2023. 4 pages.
GB Examination Report under Section 18(3) received for GB Application No. 2010979.9, dated Jun. 29, 2022. 3 pages.
GB Examination Report under Section 18(3) received for GB Application No. 2010979.9, dated Dec. 3, 2021. 3 pages.
International Search Report and Written Opinion received for PCT Application No. PCT/GB2020/051995, dated Dec. 17, 2020. 30 pages.
Combined Search and Examination Report under Sections 17 and 18(3) received for GB Application No. 2010977.3, dated Dec. 11, 2020. 6 pages.
International Preliminary Report on Patentability for PCT Application No. PCT/GB2020/051995, dated Mar. 8, 2022. 7 Pages.
International Preliminary Report on Patentability received for PCT/GB2020/051993, dated Mar. 8, 2022. 6 pages.

\* cited by examiner

RECONNAISSANCE AND COMMUNICATION ASSEMBLY

The present invention relates generally to a communications and reconnaissance assembly, adapted to be launched into the air from a gun barrel. A corresponding carrier, communications and reconnaissance payload, and method of communication and reconnaissance, are also provided.

BACKGROUND

On the battlefield, whether it be aerial, naval or land-based, communication between friendly forces, and reconnaissance of enemy targets play a vital role. However, as the nature of warfare evolves and becomes an increasingly multifaceted and long-ranging affair, the means by which to communicate across different theatres, e.g. between the air and underwater battlespace, or the ability to observe enemy targets, becomes harder. Resources are often stretched across much larger, and multiple domains.

In the interests of protecting friendly forces, it is desirable to communicate with each other and carry out recognise of the enemy, at increased distances, and across different domains.

It is an example aim of example embodiments of the present invention to at least partially avoid or overcome one or more disadvantages of the prior art, whether identified herein or elsewhere, or to at least provide a viable alternative to existing apparatus and methods.

SUMMARY OF INVENTION

In a first example there is provided a reconnaissance and communication assembly, adapted to be launched from a gun barrel into the air. The assembly comprises a carrier (with a cavity) and a payload (located in the cavity). The payload is arranged to be controllably expelled from the carrier and comprises at least one transmitter which is operable after the payload has been expelled from the carrier.

The assembly may also include a receiver adapted to detect/receive at least one of a magnetic signatures, electromagnetic signals, sonar/acoustic signals, electric field signatures, data transmission and optical signals. The receiver is also operable after the payload has been expelled from the from the carrier.

Preferably the at least one transmitter is operable to transmit data based on the detected/received signals to at least one recipient.

Alternatively, or in addition, the transmitter may be adapted to transmit at least one of an electromagnetic pulse, an electromagnetic decoy, and an electromagnetic jamming signal.

The assembly payload may also comprise a deployable configuration that is arranged, when deployed, to slow the payload down as it descends through the air after expulsion from the carrier. Optionally, the deployable configuration is arranged to deploy automatically after the payload has been expelled from the carrier. In addition the deployable configuration may be a parachute and/or comprises one or more wings or fins, optionally to provide autorotation. Optionally, the fins and/or wings are controllable to provide directional control of said payload, preferably via a moveable control surface.

The assembly payload may comprise an unmanned aerial vehicle (UAV).

The carrier may also comprise a carrier expulsion charge a carrier fuze, and the carrier fuze is adapted to trigger the carrier expulsion charge to controllably expel the payload from the carrier.

The payload may be arranged to be expelled from a rear end of the carrier, optionally via a closure.

The assembly may be arranged to be launched from a smooth bore gun barrel, and optionally the assembly is fin-stabilised. Alternatively, the assembly may be arranged to be launched from a rifled bore.

In another example, there is provided a system, itself com comprising a gun (having a gun barrel) and a communications and reconnaissance assembly according to the earlier examples. The assembly is adapted to be launched, into the air, from the gun barrel.

There is also provided an example method of launching a payload, comprising launching the communication and reconnaissance assembly into the air, from a gun barrel, expelling the payload from the carrier of the communication and reconnaissance assembly, and emitting/transmitting a signal away from the payload. The signal may be emitted as the payload descends in the air. Alternatively (or in addition) the signal may be emitted after the payload has landed on the ground or enters water.

FIGURES

For a better understanding of the invention, and to show how embodiments of the same may be carried into effect, reference will now be made, by way of example, to the accompanying diagrammatic Figures in which:

FIG. 1 schematically depicts a vessel searching for an underwater vessel in a known area;

FIG. 2 schematically depicts a vessel launching a communication and reconnaissance assembly into the air, from a gun barrel, in accordance with an example embodiment;

FIG. 3 shows the assembly of FIG. 2 being directed towards a body of water, in accordance with an example embodiment;

FIG. 4 schematically depicts different approaches to slowing the assembly in the air, before entering into the water, in accordance with example embodiments;

FIG. 5 schematically depicts how the assembly may be adapted to sink or float in the water according to example embodiments;

FIG. 6 schematically depicts a salvo of assemblies of FIG. 2 being directed towards a region of water, in accordance with an example embodiment;

FIG. 7 schematically depicts a salvo of assemblies of FIG. 2 carrying out reconnaissance operations in the water, in accordance with an example embodiment;

FIG. 8 schematically depicts a vessel identifying the location of an underwater vessel;

FIGS. 9 to 11 schematically depict how to initiate the main charge of a munition, under the water, in accordance with a particular criteria, according to example embodiments;

FIG. 12 schematically depicts an assembly according to an example embodiment, including a receiver according to an example embodiment;

FIG. 13 schematically depicts a salvo of assemblies of FIG. 2 carrying out reconnaissance operations in the water, in accordance with another example embodiment;

FIG. 14 schematically depicts examples of multi-body assemblies in accordance with an example embodiment;

FIG. 15 schematically depicts a salvo of assemblies communicating between each other in accordance with an example embodiment;

FIG. 16 schematically depicts an assembly acting as a communication node in accordance with an example embodiment;

FIG. 17 schematically depicts a communication and reconnaissance assembly, comprising a carrier and a payload, in accordance with an example embodiment;

Figure 21:
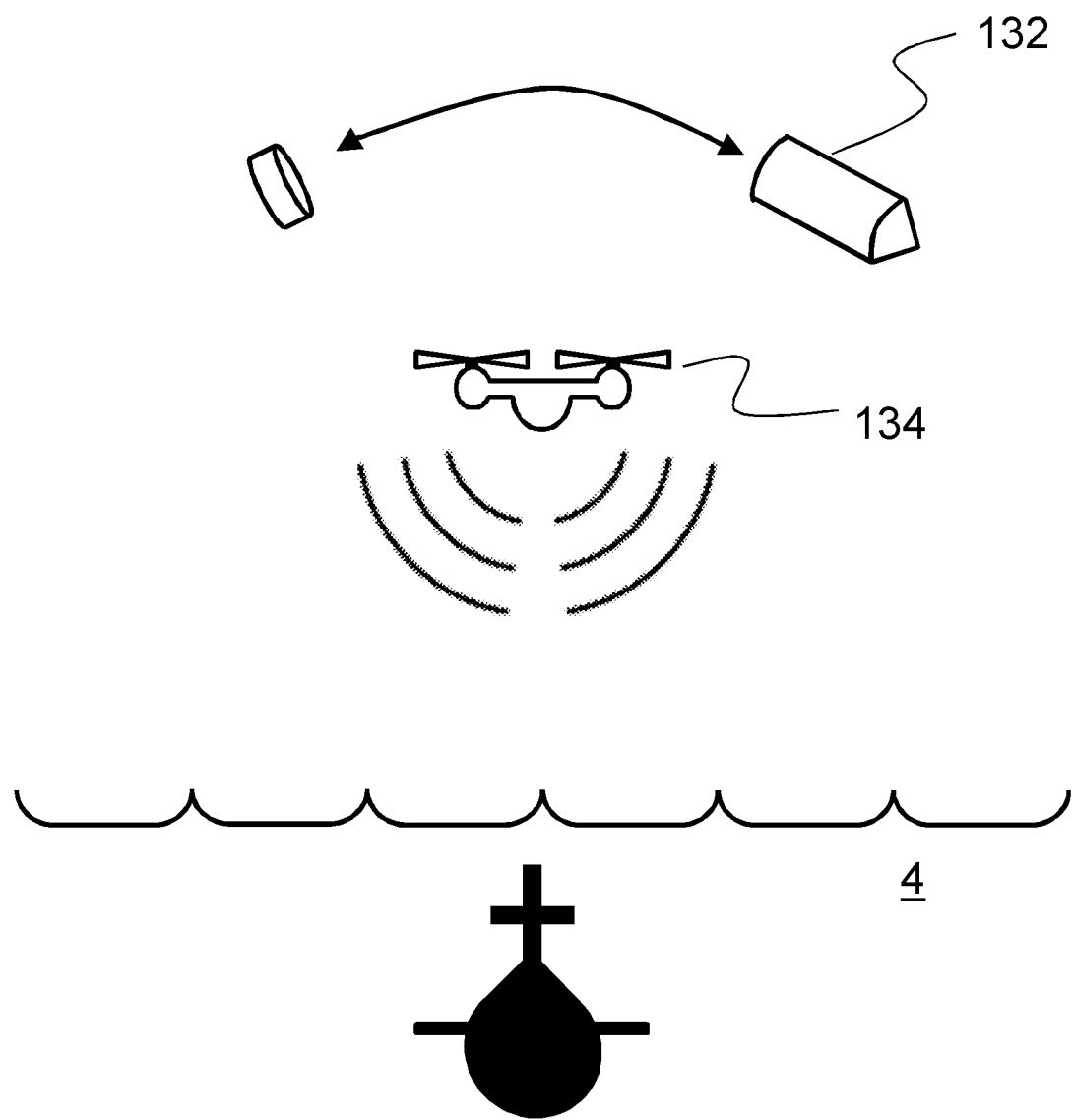
Figure 22:
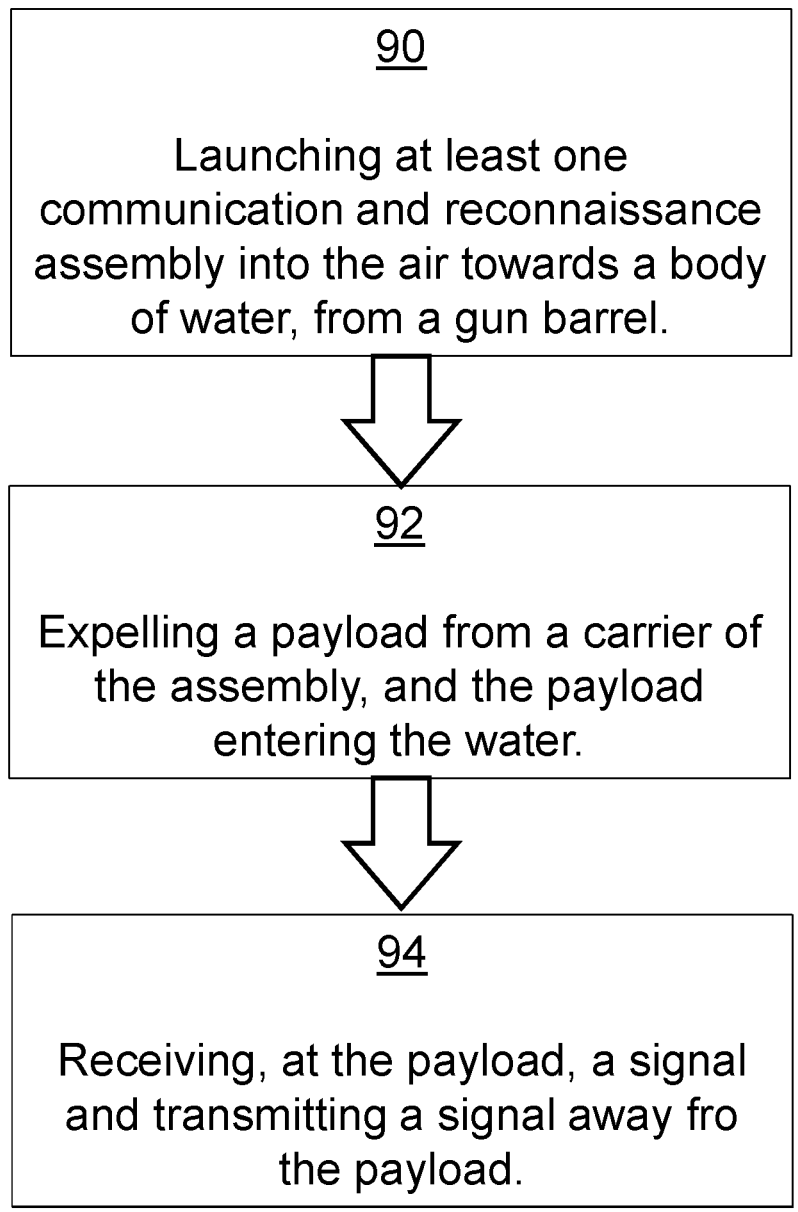
Figure 23:
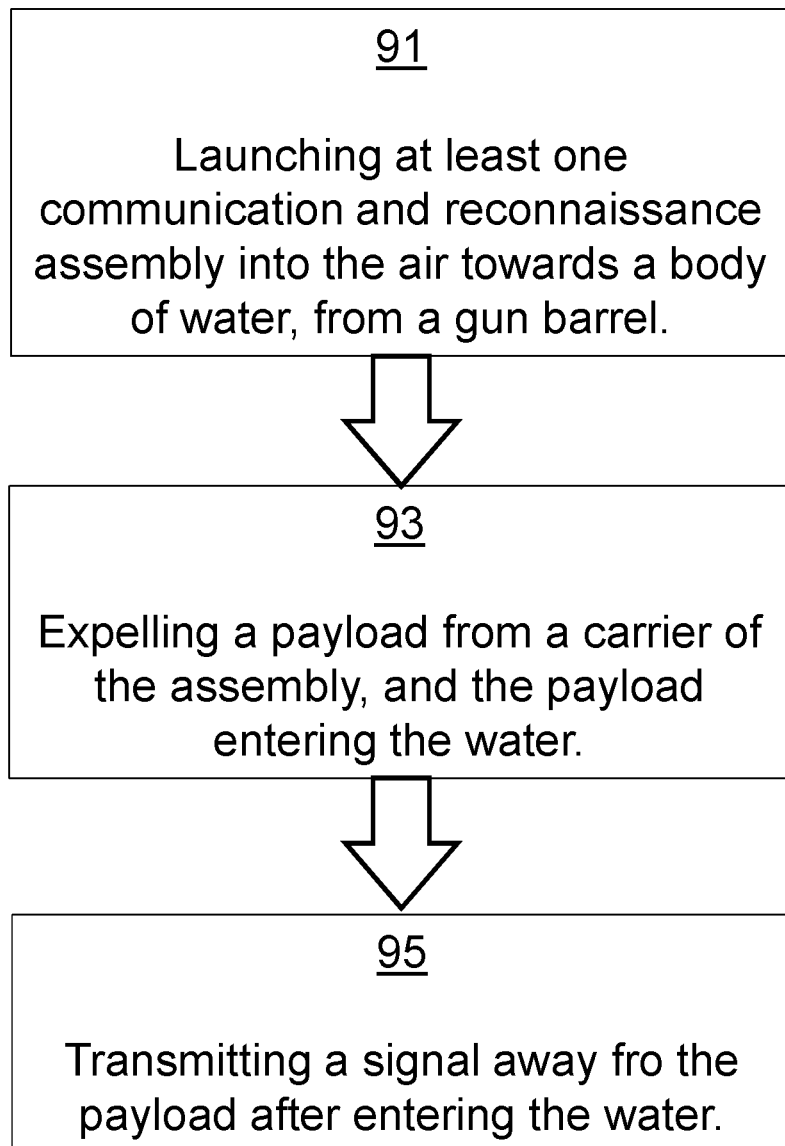

FIG. 21 schematically depicts a communication and reconnaissance assembly comprising an unmanned aerial vehicle in accordance with an example embodiment; and FIGS. 22 and 23 depict a method of operating a communication and reconnaissance assembly in accordance with an example embodiment.

DETAILED DESCRIPTION

As discussed above, there are numerous problems associated with the increased range at which modern warfare communication and reconnaissance operations are expected take place. These range from the increased threat to friendly forces the closer they are to enemy targets, to the increased difficulties in communicating between friendly forces at across multiple/different domains.

According to the present invention, it has been realised that the problems associated with existing approaches can be overcome in a subtle but effective and powerful manner, as discussed below.

Figure 1:
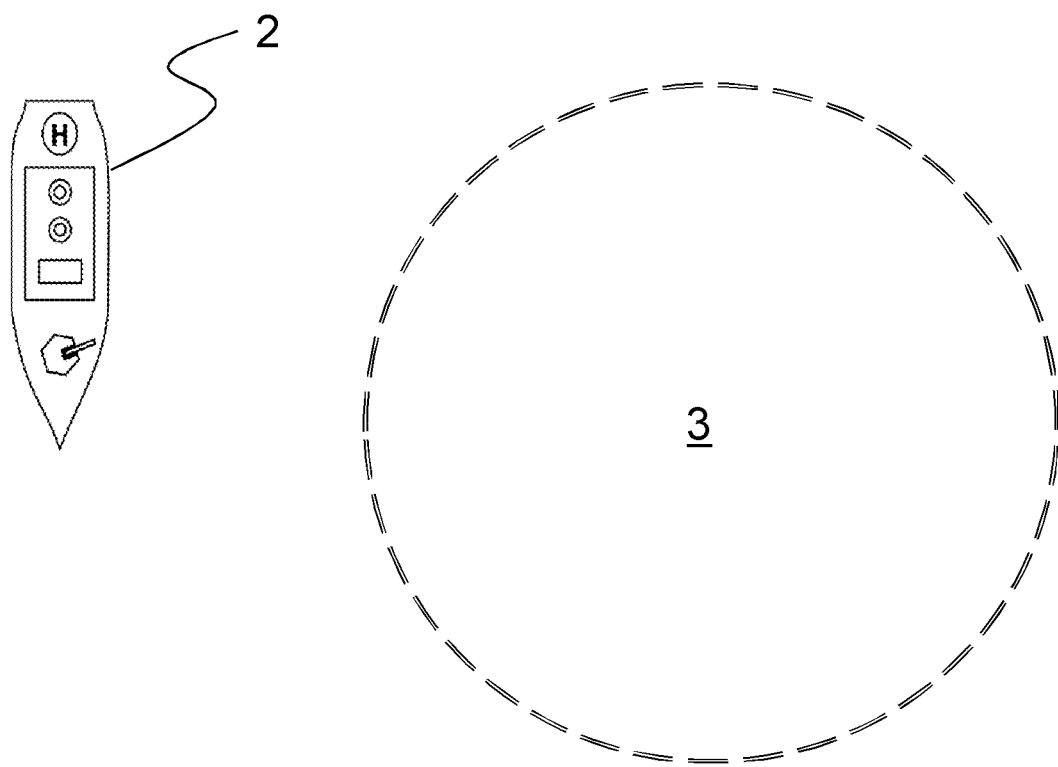

FIG. 1 illustrates an example situation wherein a static platform or mobile vessel, in this instance a battleship 2, is attempting to identify and/or locate a target or object within a region of water 3. The target or object to be identified and/or located in this example is a suspected enemy submarine (or other underwater vessel or platform). It will be recognised by the person skilled in the art that other platforms or vessels aside from the example battleship 2 could be employed by the present invention, including but not limited to: land-based vehicles; land platforms; or aircraft.

Figure 2:
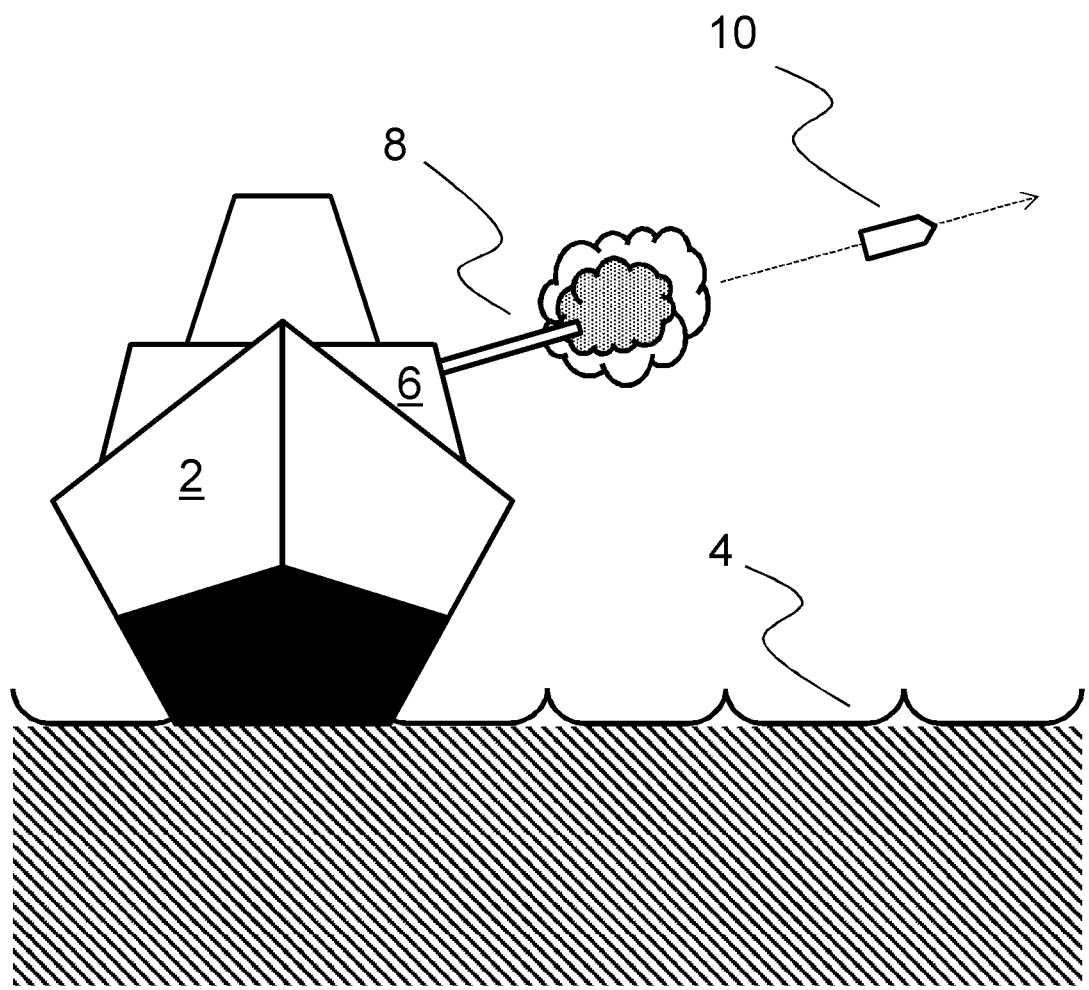

As seen in FIG. 2 the battleship 2 is located on a body of water 4, and comprises a gun 6 having a gun barrel 8. Other examples may not include a particular vehicle, and could simply comprise a gun, e.g. on static land or water-based platform. In order to more accurately locate the enemy submarine, a communications and reconnaissance assembly 10 is explosively launched into the air from the gun barrel 8. Each assembly comprises a transmitter, and in this example the transmitter is adapted to emit sound waves, i.e. sonar "pings". This allows the battleship 2 to deploy the assembly 10 at significant range, and accuracy. The assembly 10 will typically be arranged to be launched from a smooth bore gun barrel. Optionally, the assembly may be fin-stabilised. Alternatively, the assembly may be arranged to be launched from a rifled bore. The exact configuration will be dependent on the required application, which are discussed later on in other examples.

Care must be undertaken to ensure that the combination of assembly properties (e.g. size, weight, shape and so on) and launch specifications (e.g. explosive propulsion) is such that the assembly 10 is not damaged on launch. This might require particular care to be given to the explosive resistance of the assembly 10, or at least constituent parts located within the assembly. Such concepts will be known or derivable from munitions technologies typically involved in gun-based launching.

Figure 3:
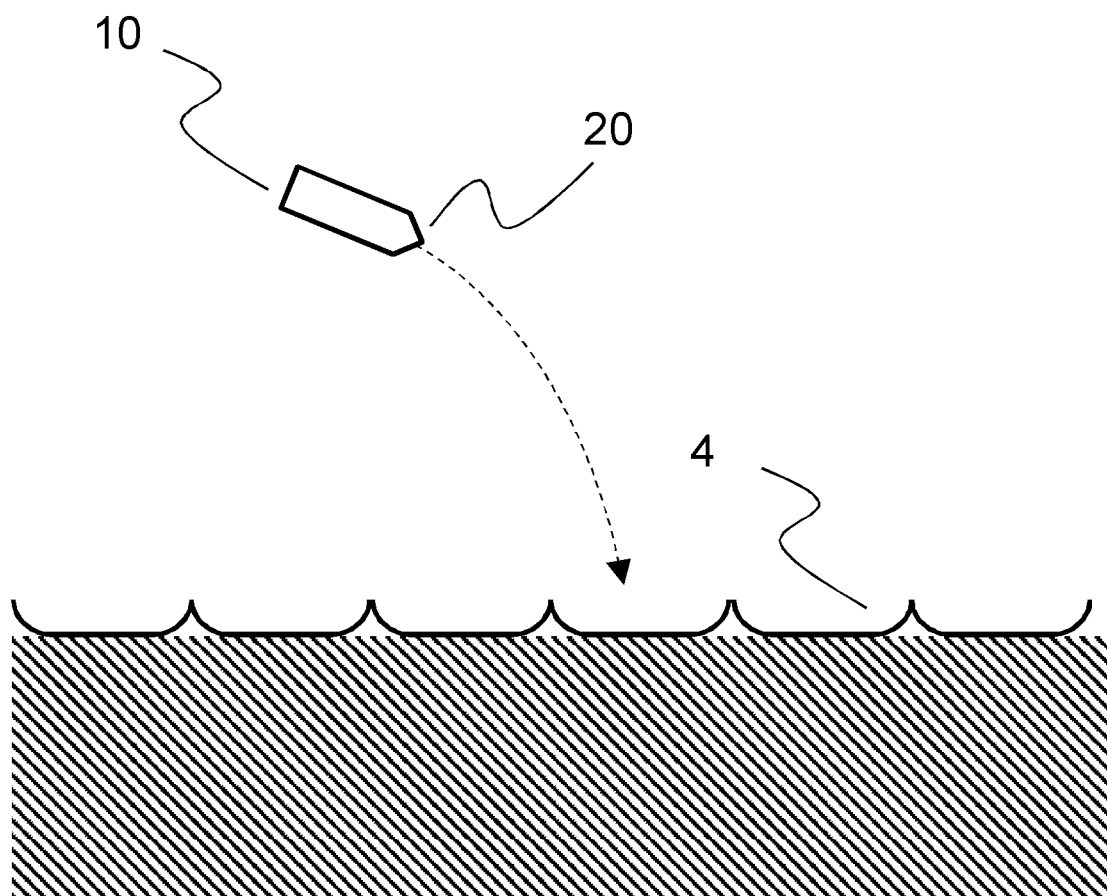

As shown in FIG. 3, in the present example the assembly 10 is adapted to enter the body of water 4 within the region of water 3, within which enemy submarine is located. The use of a gun barrel 8 ensures a high degree of accuracy in terms of ranging and general targeting of the region of water 3. This means that the range of the assembly 10 could be hundreds of metres, or even kilometres, overcoming range problems associated with existing apparatus or methodology. At the same time, the assembly 10 will typically be a projectile, therefore being un-propelled and/or including no form of self-propulsion. This means that the assembly 10 is relatively simple and inexpensive. Altogether then, this means that the assembly 10 according to example embodiments can be used to accurately, cheaply, effectively, and generally efficiently locate targets at quite some distance from a platform, vessel, vehicle, and so on, or a related gun, that launches the assembly 10. Also, the use of an assembly 10 that is capable of being launched from a gun barrel 8 means that multiple assemblies 10 can be launched very quickly in succession from the same gun barrel 8, or in succession and/or in parallel from multiple gun barrels, optionally from different platforms or vehicles, or optionally being targeted onto or into the same location/vicinity 3 of the same body of water 4. Again then, target location efficiency and effectiveness may be increased, in a relatively simple manner.

Having been explosively launched from a gun barrel 8, the assembly 10 will enter the body of water 4 with significant speed. In a practical implementation, care will need to be undertaken to ensure that the combination of assembly properties (e.g. size, weight, shape and so on) and impact speed with the water 4 is such that the assembly 10 does not explode, or is damaged on impact. This might require particular care to be given to the impact resistance of the assembly 10, or at least constituent parts located within the assembly, typically associated with initiating communications or reconnaissance role of the assembly 10.

In one example, a simple but effective feature which may assist in this regard is the head or tip 20 of the assembly 10 being ogive-shaped or roundly-shaped or tapering, in accordance with the typical shape of other gun-launched projectiles. This is in contrast with a depth charge or similar water-entry devices. However, this may not be sufficient in isolation, or even in combination with structural impact-resistant features of an assembly to prevent damage to the assembly 10 on impact with the water 4, such that it does not work satisfactorily under the water 4.

Figure 4:
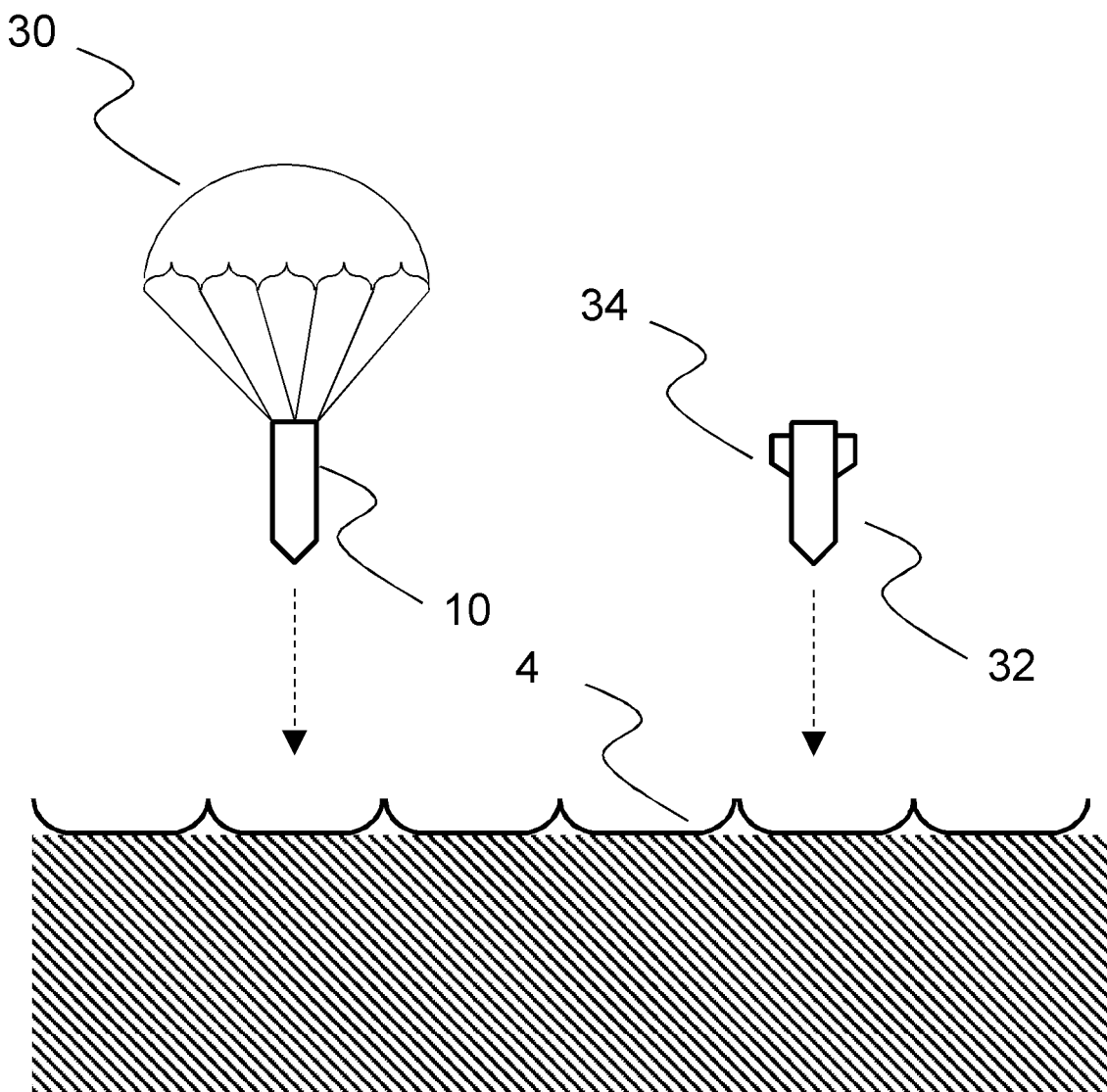

FIG. 4 shows that in addition to, or alternatively to, an impact resistant or accommodating structure of the assembly 10, the assembly 10 may be provided with a deployable configuration that is arranged, when deployed at some time after launch, to slow the assembly 10 in the air before entry into the water 4. In order to successfully locate or identify an underwater target described herein, the speed of decent of the assembly 10 into, and optionally down, through the water 4 to a desired depth may be less important than the speed of delivery of the assembly 10 from the gun 6 to the desired location. In other words, the assembly 10 does not need to (or in fact may be desired not to) enter the water 4 at a particularly high velocity. Therefore, deceleration of the assembly 10 prior to entering the water 4 is acceptable, and in many cases may actually be desirable. That is, slowing the assembly 10 prior to entering the water 4 may be far simpler or easier to achieve than designing the assembly 10 to withstand high speed impact with the water 4. This is because such a design might mean that the cost of the assembly is excessive, or that the weight of the assembly is excessive, or such that the space within the assembly for important communications and/or reconnaissance components is reduced. In other words, some form of air brake might be advantageous.

FIG. 4 shows that, in one example, the deployable configuration could comprise a parachute 30. The parachute 30 could be deployed after a certain time from launch of the assembly 10, or could, with appropriate sensing or similar, be deployed upon particular distance proximity sensing with respect to the water 4. In another example, a similar assembly 32 is shown. However, this similar assembly 32 comprises a different deployable configuration in the form of one or more deployable wings or fins 34. These deployable wings or fins 34 may be deployed in the same manner as the parachute 30 previously described. The wings or fins 34 might optionally provide a degree of auto rotation to slow or further slow the assembly 32. As discussed above, it is desirable for the assembly to reach the target location 3 quickly and effectively, while at the same time being relatively inexpensive and having maximum effectiveness. It is therefore desirable not to pack the assembly 32 with complicated or advanced guiding or directionality mechanisms, which might be used to control the directionality of the descent of the assembly 32. However, in some examples the fins and/or wings 34 previously described may be controllable to provide directional control of the descent of the assembly 32, for example via a moveable control surface provided in or by the fins or wings. Such control is typically not to be used during projectile-like flight of the assembly 32, for example immediately after launch, but instead might be used for a degree of tuning control of the descent of the assembly 32 into the body of water 4. This might improve targeting accuracy and effectiveness of locating a target within the body of water 4. However, as alluded to above, in other examples the assembly according to example embodiments may be free of such directional (descent) control, to ensure that the cost and complexity of the assembly is minimised, and such that any related cost or space budget is taken up with more core aspects, such as communication and/or reconnaissance components.

Figure 5:
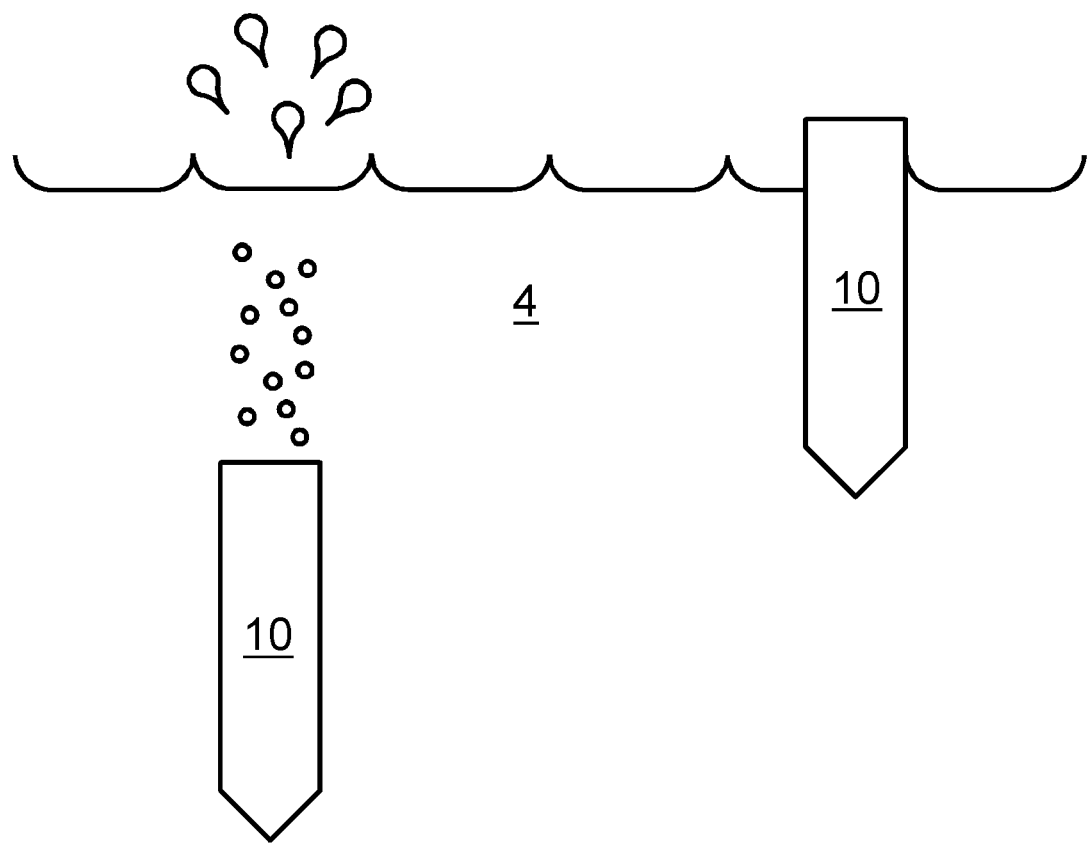

FIG. 5 displays two different examples wherein the assembly 10 comprises a single body. In the first example, the assembly 10 is designed to descend within the body of water to a desired depth, including to perhaps keep descending. After entering the body of water 4, the assembly 10 may be arranged to retract or dispose of the deployable configuration, so that the deployable configuration does not slow (or slow to too great an extent) the descent of the assembly 10 to the desired depth. For similar reasons, the munition might be free of any such deployable configuration, such that there is no impact on descent in the water. Descent through the water 4 may need to be as fast as possible (e.g. to be useful before the target object has moved to avoid detection). In a second example, the single body of the assembly 10 is buoyant at, or near to, the surface of the water 4.

In either example, the assembly 10 may be arranged to align itself in a particular orientation once it has entered the water 4, for example, wherein the back end of the assembly is more buoyant than the front end, so that the assembly points downwards in the water.

In other examples discussed in greater detail later on, the assembly may comprise multiple bodies connected via at least one tether, wherein at least one of the bodies is adapted to be buoyant at or near the surface of the water and at least one other body is adapted to sink in the water.

Figure 6:
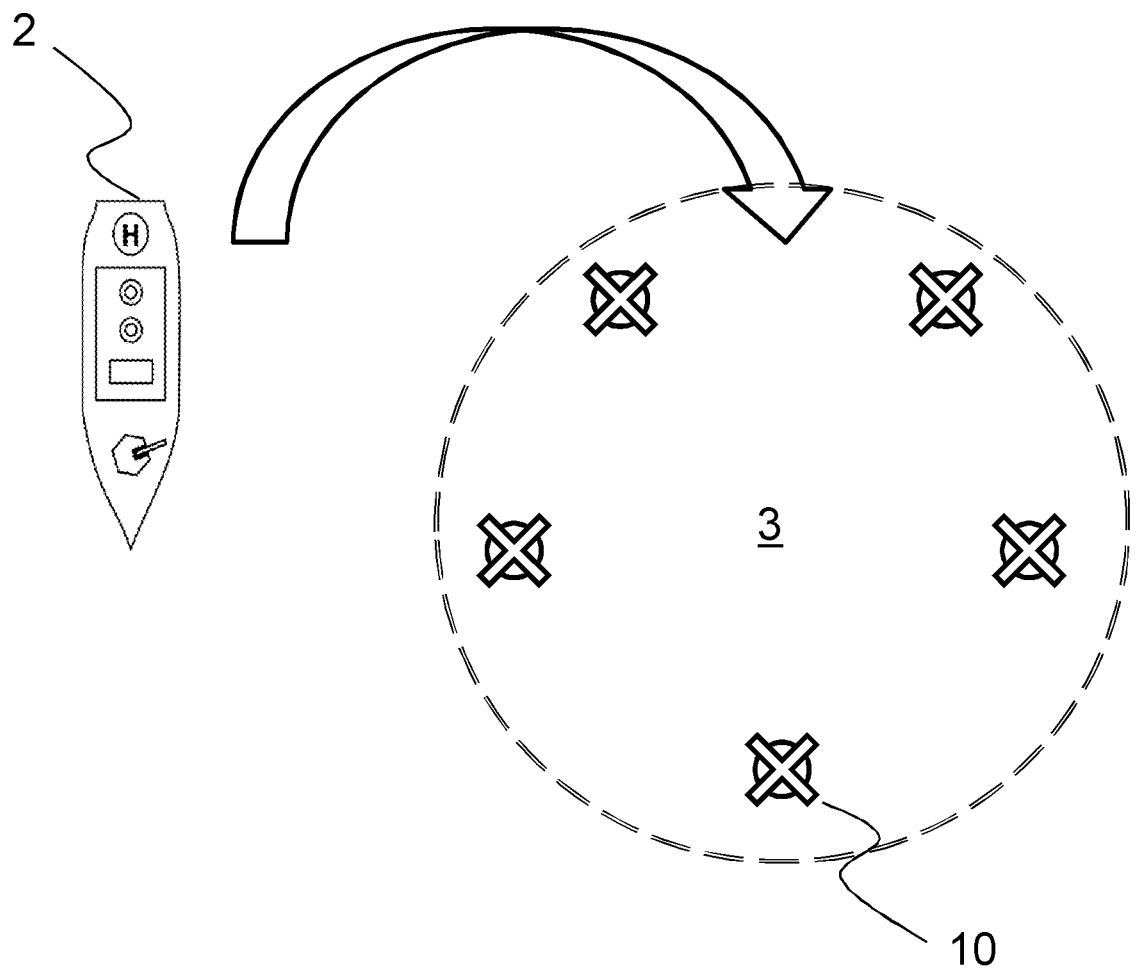

In the example shown in FIG. 6, multiple assemblies are launched into the region of water 3 where the enemy submarine is suspected to be located, so as to increase the chances of successfully identifying and or locating the submarine. The gun-launched nature of the invention means that multiple communication and reconnaissance assemblies may be quickly and accurately deployed to the target region 3. However, in other examples, it may be sufficient to use only a single assembly.

Figure 7:
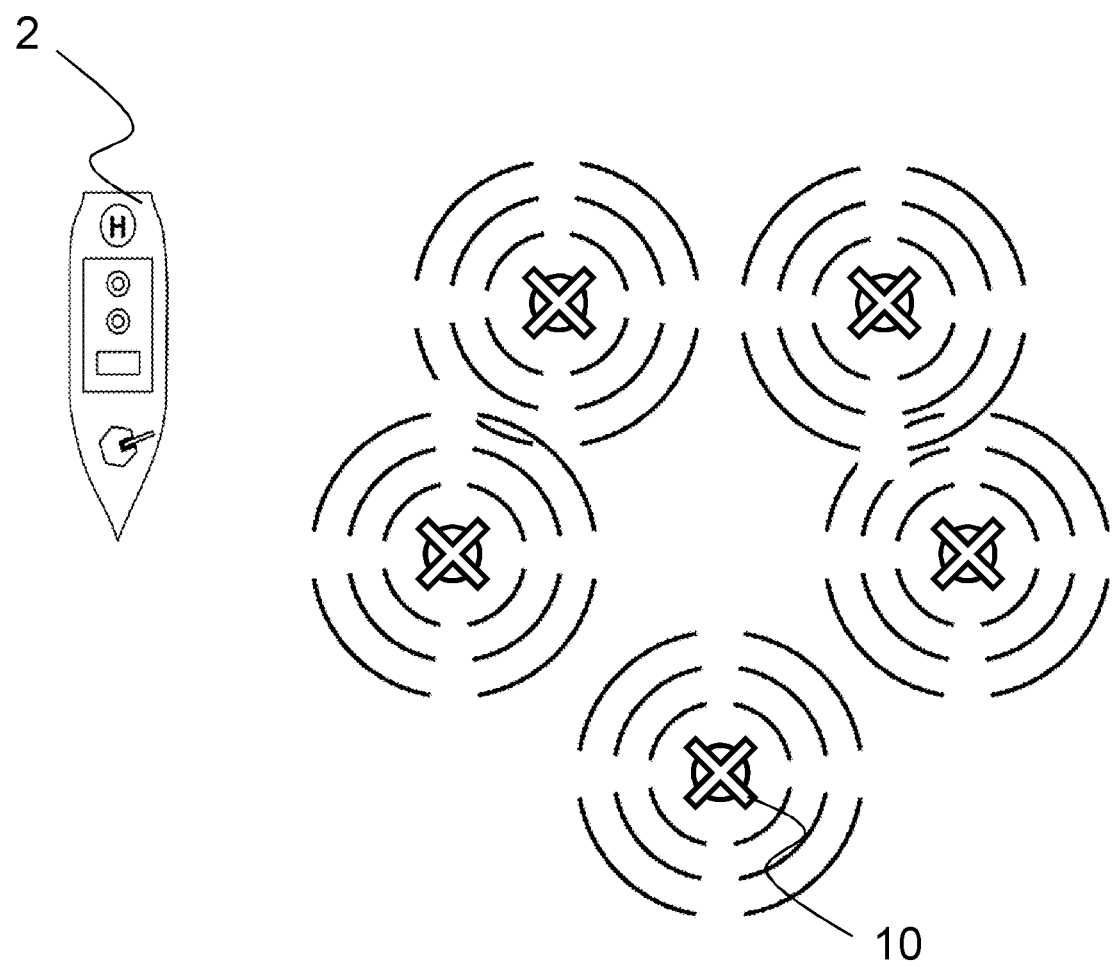

As show in FIG. 7, after entering the body of water, the transmitter of each assembly emits sound waves, i.e. sonar "pings" and the battleship 2 is equipped with sonar-detecting equipment in order to detect sonar echoes/reflections from bodies/objects in the water. When utilising multiple sonar assemblies, in order to properly triangulate the location of the object or body, e.g. an enemy submarine, individual sonar pings much be able to be differentiated from each other. In some examples, each of the assemblies emits a different frequency of sound wave, a different frequency pattern (e.g. rising, falling) or each sonar assembly may be adapted to emit sonar pings in a particular order, or at a particular time after being launched from the platform/vehicle. Owing to the accurate nature by which the sonar assemblies can be launched into water at desired points, the location of an unwater object or target can be precisely calculated from the identifiable sonar reflections.

Figure 8:
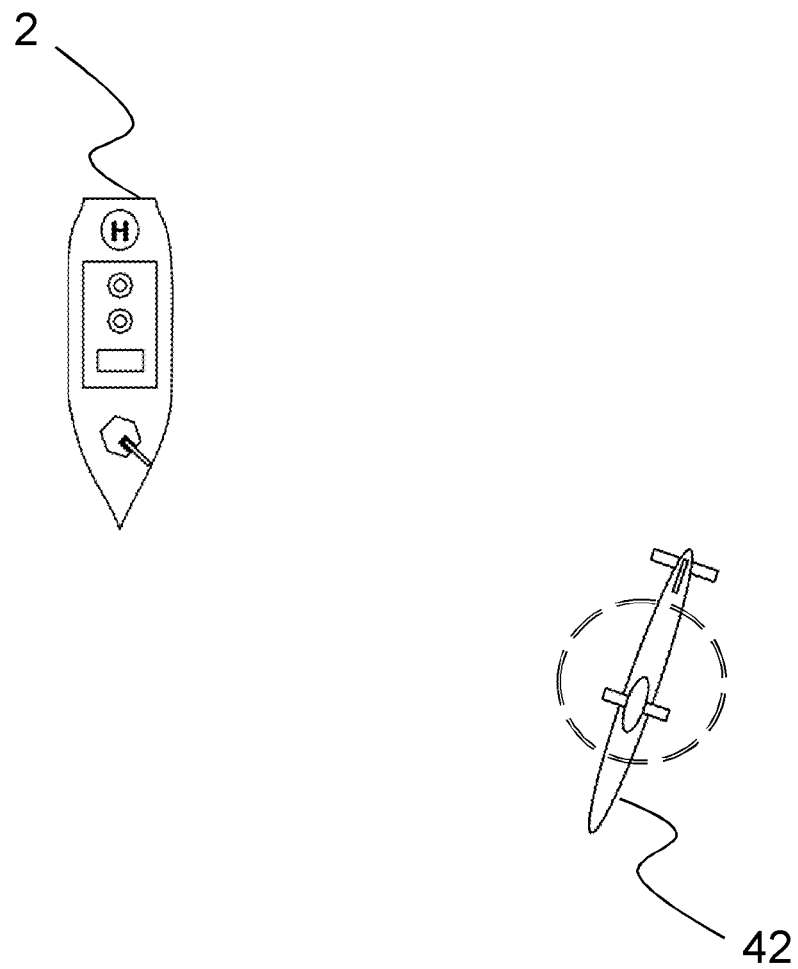

As shown in FIG. 8, once the location of the submarine 42 has been confirmed, the battleship 2, and/or any other platform or vehicle, may engage the submarine with underwater munitions, such as depth charges 11. Each depth charge 11 each comprises a fuze which can be adapted to trigger 40 explosives within the depth charge 11 in order to successfully and effectively engage an underwater target 42.

Figure 9:
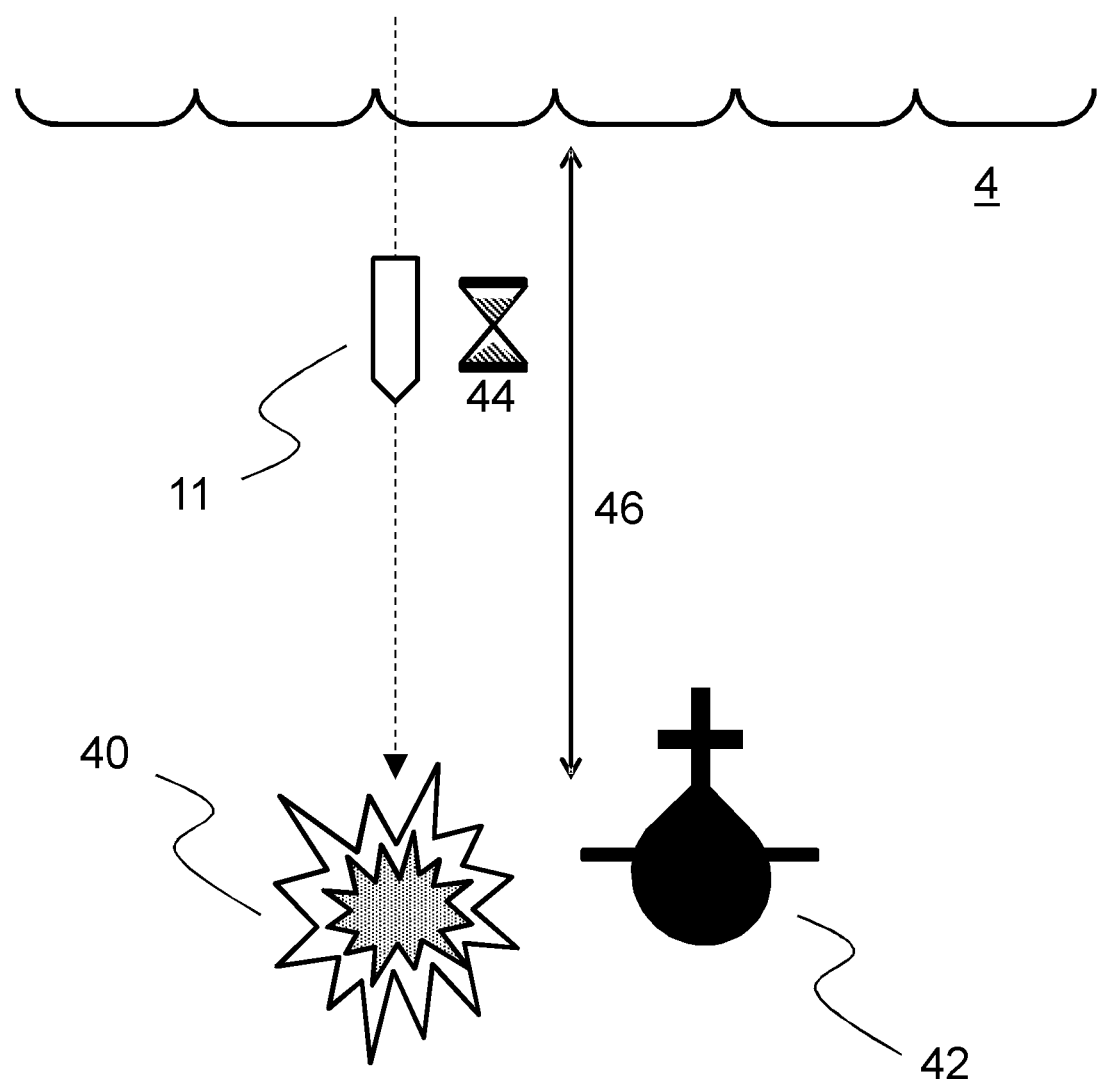

As shown in FIG. 9, this might be achieved by triggering the explosive charge after a particular time 44, for example from one or more of a combination of launch from the gun barrel 8 described above, and/or a predetermined time period after entering the water 4. This time period will typically equate to a particular depth 46 within the water 4 (e.g. based on expected or calculate rate of descent). Alternatively, the triggering 40 may occur at the particular depth 46 in combination with or irrespective of the timing 44. For example, an alternative or additional approach might involve the direct detection of depth (via one or more sensors or similar). Depth may be detected based on time, as above, or perhaps based on water pressure under the surface, the salinity of the water, the temperature of the water, or even at a predetermined speed-of-sound in the water. All of these may be indicative of depth within the water, for example which may be known in advance from mapping of the area, and/or sensed by the depth charge 11 via one or more sensors when descending through the water.

Of course, the fuze may be also be adapted to trigger the explosive charge upon impact with the target 42. However, it may be safer to employ some form of depth-activation, so that the munition explodes at/near the depth of the target, avoiding possible unintentional explosions at or near objects that are not targets.

As above, the fuze may be programmed with such criteria, or related criteria necessary for the fuze to trigger the explosive as and when intended.

Figure 10:
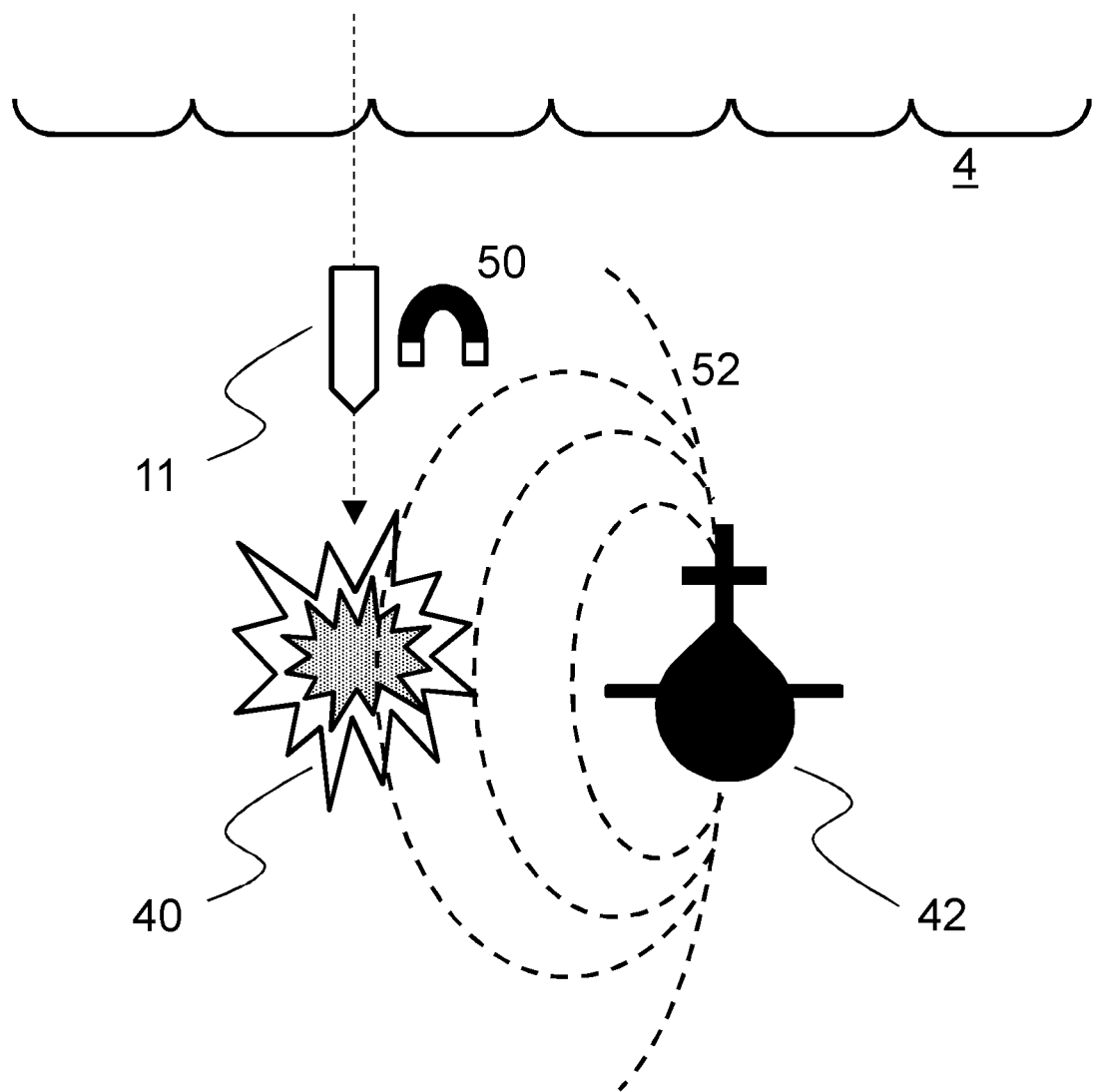

FIG. 10 shows a different adaptation for triggering 40 an explosive charge of the depth charge 11 under the water, this time upon magnetic detection 50 of a target magnetic signature 52. In a crude sense, the target magnetic signature could simply be the detection of anything magnetic, indicating the presence of a magnetic or magnetisable structure. For instance, once a detected magnetic a field strength is above a relevant threshold, the depth charge 11 might explode. In a more sophisticated manner, it may be known or derivable in advance to determine what the expected magnetic signature 52 of the particular target 42 might be, might look like, or might approximate to. This might equate to field strength, or field lines, or changes therein. In this example, the depth charge 11 might not be triggered 40 to explode until the magnetic detection 50 detects a very particular magnetic signature 52, and not simply any magnetic field or change therein.

Figure 11:
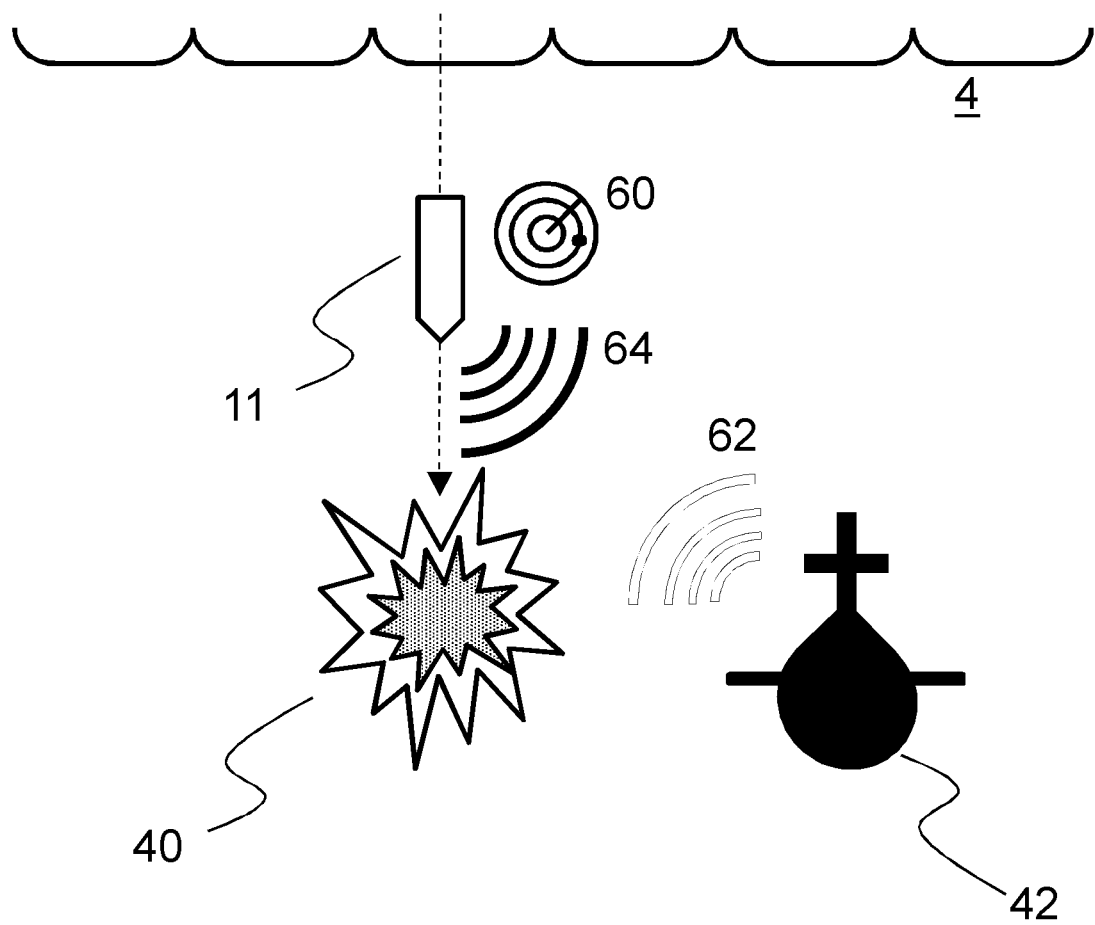

While FIG. 10 discusses the use of magnetic fields, much the same principle may be used to detect electric field signatures. FIG. 11 shows another example of triggering. In this example, the triggering 40 of the explosive charge in the depth charge 11 is undertaken based on the detection of pressure waves in the water 4, thereby implementing a sonar-like system 60. The system may be implemented in one of a number of different ways. In one example, the depth charge 11 may be arranged to detect a pressure wave 62 emanating from target object 42. This could be a sonar pulse 62 originating from the object 42, or simply detection of sound generated by the object 42, or could instead be a reflection 62 of a sonar pulse 64 originating from the depth charge 11. That is, the depth charge 11 may not only detect pressure waves, but may emit pressure waves. As with the magnetic field examples given above, the explosive charge may be triggered 40 when a target sonar signature is detected 60, and this could be when any pressure wave is detected, or more likely when a pressure wave above a certain threshold is detected, or when a particular pressure wave or a series of pressure waves is detected which is indicative of the presence of a particular target 42.

In general, the depth charge 11 may be able to detect or infer entry into the water, or making contact with the water. This might be useful in initiating or priming fuze activity, for example starting a timer, taking a base or initial reading of pressure, salinity, temperature, and so on (or any relevant criteria), or anything which may assist in the subsequent use of the fuze to trigger the explosive. This sensing or inference could be via an environmental sensor or similar that is (already) present in order to perform another function, for example those discussed or alluded to above. Alternatively, the sensing or inference could be via a dedicated sensor, for example a dedicated impact or water/moisture sensor, or temperate sensor, pressure sensor, salinity sensor, and so on. In general terms, the munition may be able to detect or infer entry into the water, or making contact with the water, for safety reasons, where some (e.g. explosive) function is prevented prior to water contact/entry.

Whilst the above example employs a sonar/sound emitting assembly for submarine location, in other examples the transmitter may be adapted to emit other types of signals, including but not limited to electromagnetic pulses; electromagnetic decoy signals; and electromagnetic jamming signals. These assemblies can be used to disable, disrupt or disorientate enemy submarines, or disguise the location and/or location of friendly platforms/vessels in or below the water.

Figure 12:
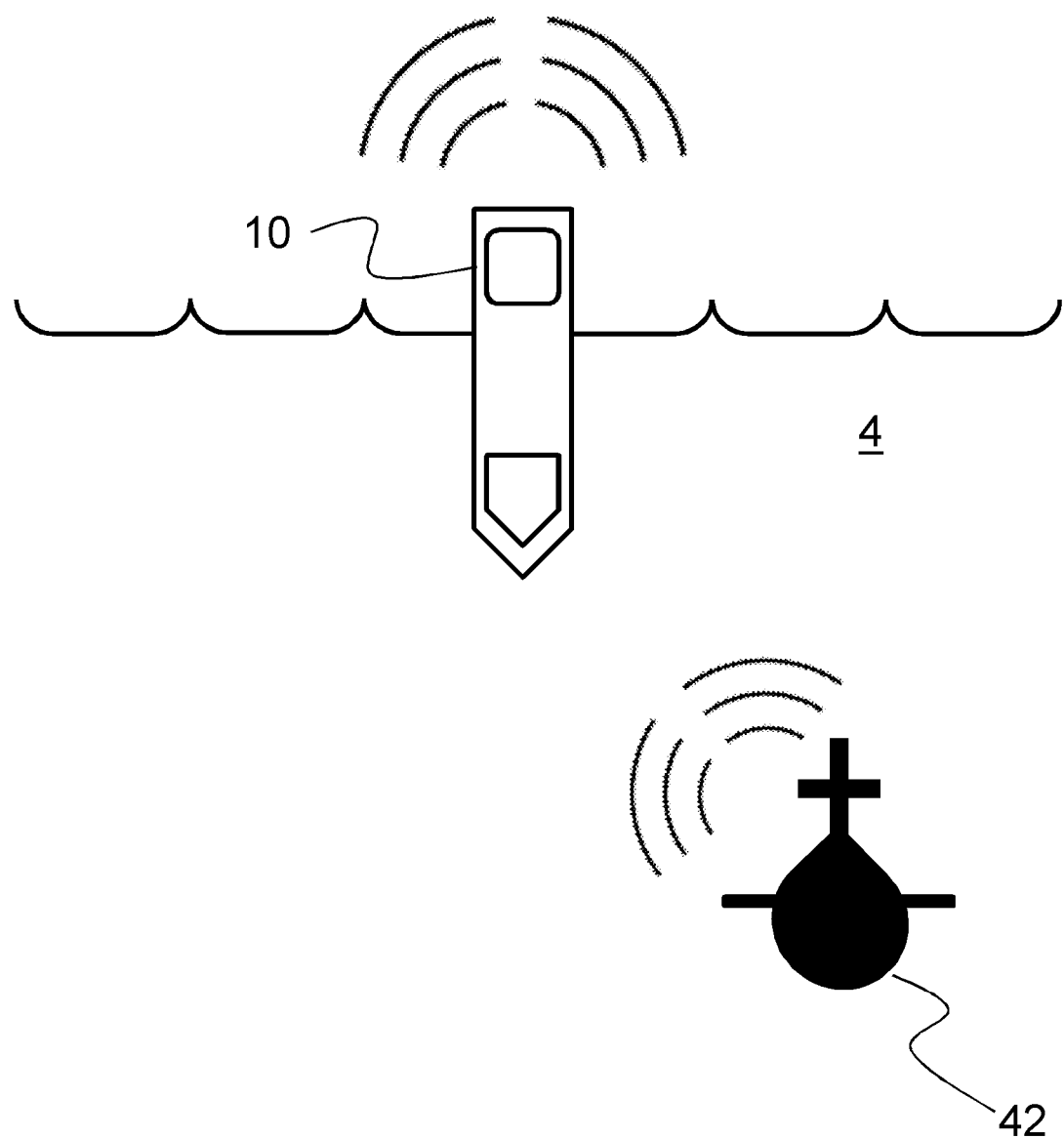

In an example shown in FIG. 12, a single-bodied communication and reconnaissance assembly 10 comprises a receiver in addition to the at least one transmitter. The receiver is adapted to detect/receive signals after the assembly 10 has entered the water, and the transmitter is operable to emit data signals to at least one recipient. The receiver may be adapted to detect a plurality of signals/signatures including but not limited to: magnetic signatures; electromagnetic signals; sonar/acoustic signals; electric field signatures; and information transmission, either reflected by, or emitted by, an underwater body, e.g. an enemy submarine 42. The single bodied assembly is adapted to be buoyant at, or near to, the surface of the water 4. In a further example, the assembly 10 may be arranged to align itself in a particular orientation once it has entered the water 4, for example, wherein the back end of the assembly is more buoyant than the front end, so that the assembly points downwards in the water. This would allow a transmitter to be located above or near the top of the water 4, and a receiver to be located under the water 4, if desired.

Figure 13:
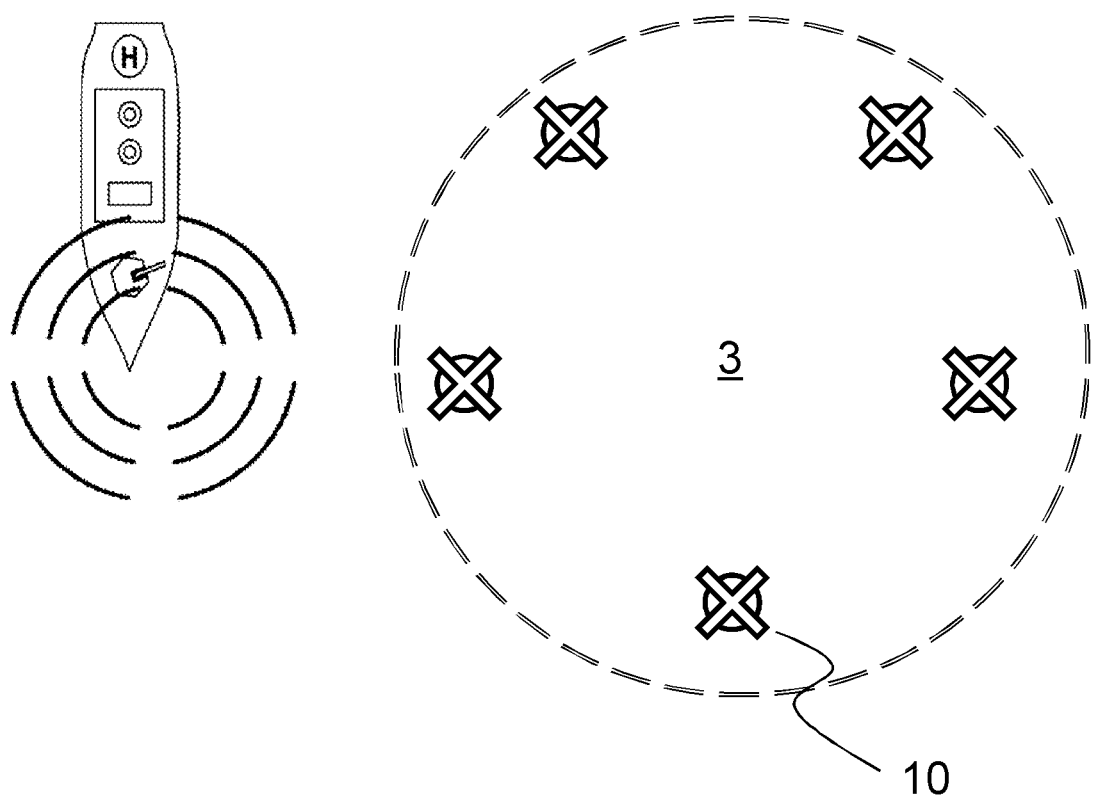

In the example shown in FIG. 13, multiple assemblies 10 have been launched in to a region of water 3 in an effort to identify and/or locate an underwater object/body, e.g. an enemy submarine. The receiver of each assembly 10 is adapted to detect sonar signals, and the transmitter is adapted to transmit any received sonar information external to and away from the assembly e.g. back to the battleship 2, or to another communication node (discussed in greater detail later). The information may be transmitted to multiple other vessels or platforms simultaneously. In this example, a separate vessel or platform, e.g. the battleship 2, emits sonar pings toward the a region 3 to be interrogated, and each of the assembly receivers are adapted to listen out for any reflected sonar signals, and report back to the battleship 2. The received signal from each sonar assembly 10 is able to be attributed-to a given sonar assembly 10, e.g. through standard metadata and identifying means, and therefore the location of the received sonar information can be determined from the location a given assembly was launched to. The location of an underwater body or vessel can then be triangulated using the received echo timing and location data. In another example, the sonar assemblies 10 may comprise GPS receivers to provide even more accurate location data back to the battleship 2 (or other vessel or platform) with regard to the received sonar information. Whilst a single assembly 10 may be used, the effectiveness of locating an underwater object or body is increased by using multiple assemblies.

In another example, the emitted sonar pulse is provided by at least one of the salvo of sonar assemblies 10 launched into a region 3, as described in the example shown in FIG. 7. As discussed earlier, in other examples individual assemblies may be adapted to detect different or multiple types of signal, including but not limited to: magnetic signatures; electromagnetic signals; sonar/acoustic signals; electric field signatures; and information transmission, either reflected by, or emitted by, an underwater body, e.g. an enemy submarine 42.

Figure 14:
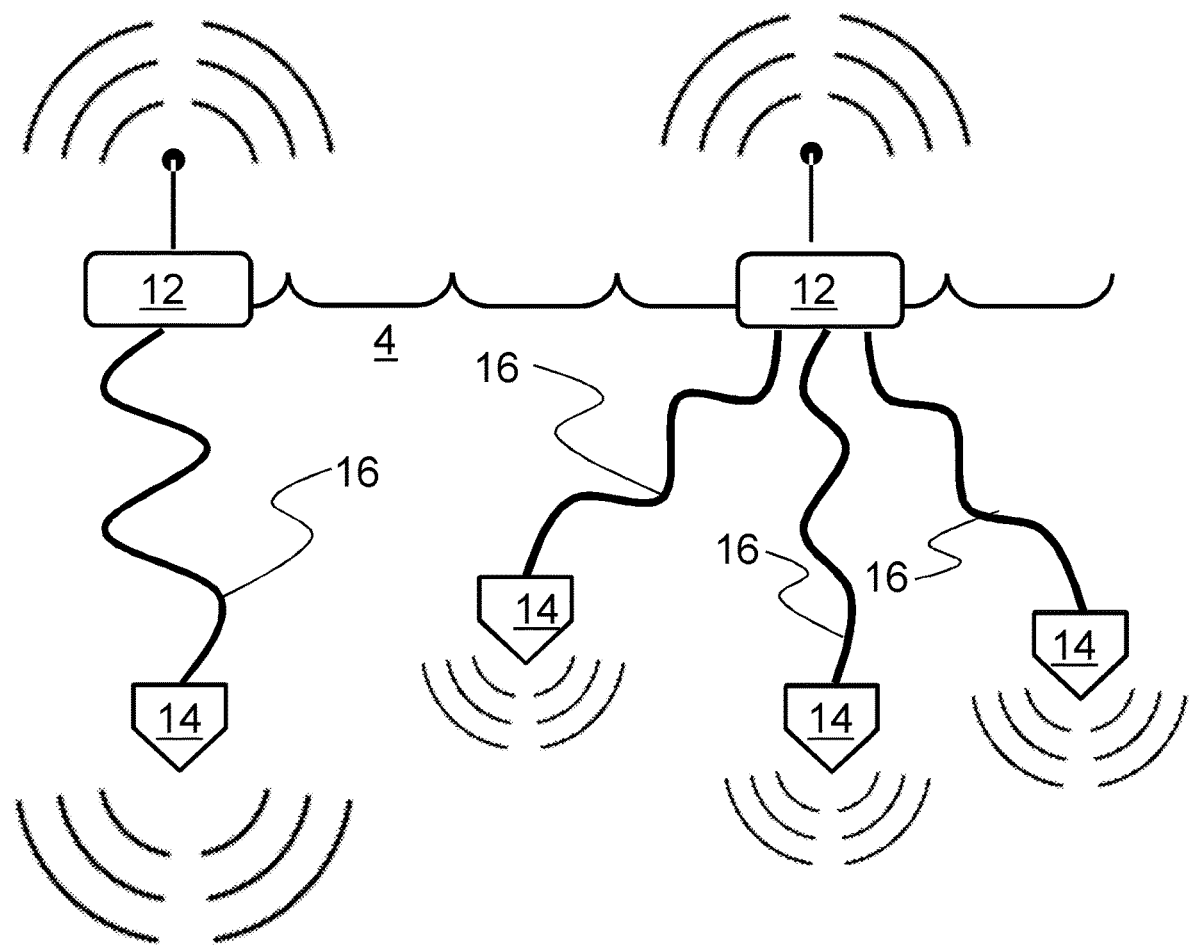

In the examples shown in FIG. 14, the assembly 10 may comprise multiple bodies 12, 14 connected by a tether 16. The assembly 10 is adapted to maintain a single body formation during launch and entry into the water, and divide into the multi-body formation once it has entered the water. A first body 12 is adapted to be buoyant at or near the surface of the water, and a second body 14 is adapted to sink in the water 4. The tether is adapted not only to maintain a maximum distance between the bodies 12, 14 but also to transmit data between the first 12 and second 14 bodies. In one example, the assembly consists of a single first body 12 and multiple secondary bodies 14 in something akin to a jellyfish formation. In the example show, the second bodies 14 are adapted to detect signals, e.g. sonar, and transmit the sonar data along the tether 16 to the transmitter in the first body 12 at the water's surface. The sonar information may then be transmitted external to and away from the assembly, e.g. back to the battleship 2, or to another communication node. In another example, one of the second bodies 14 is adapted to emit a sonar pulse.

Figure 15:
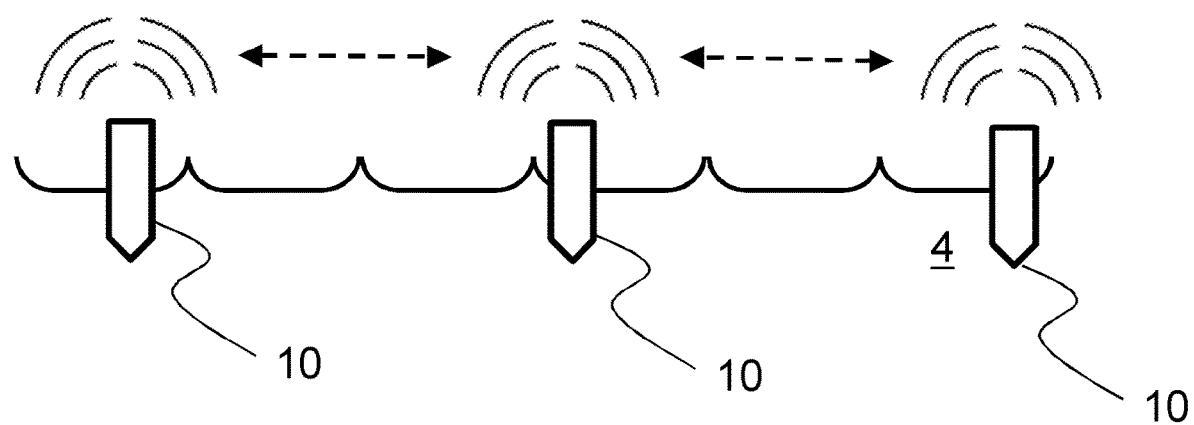

As shown in FIG. 15, individual communication and reconnaissance assemblies 10 which comprise both a receiver and a transmitter can be employed as communication nodes, i.e. "daisy-chained" to transmit data more reliably over longer distances than would be achievable with a single remote assembly 10.

Figure 16:
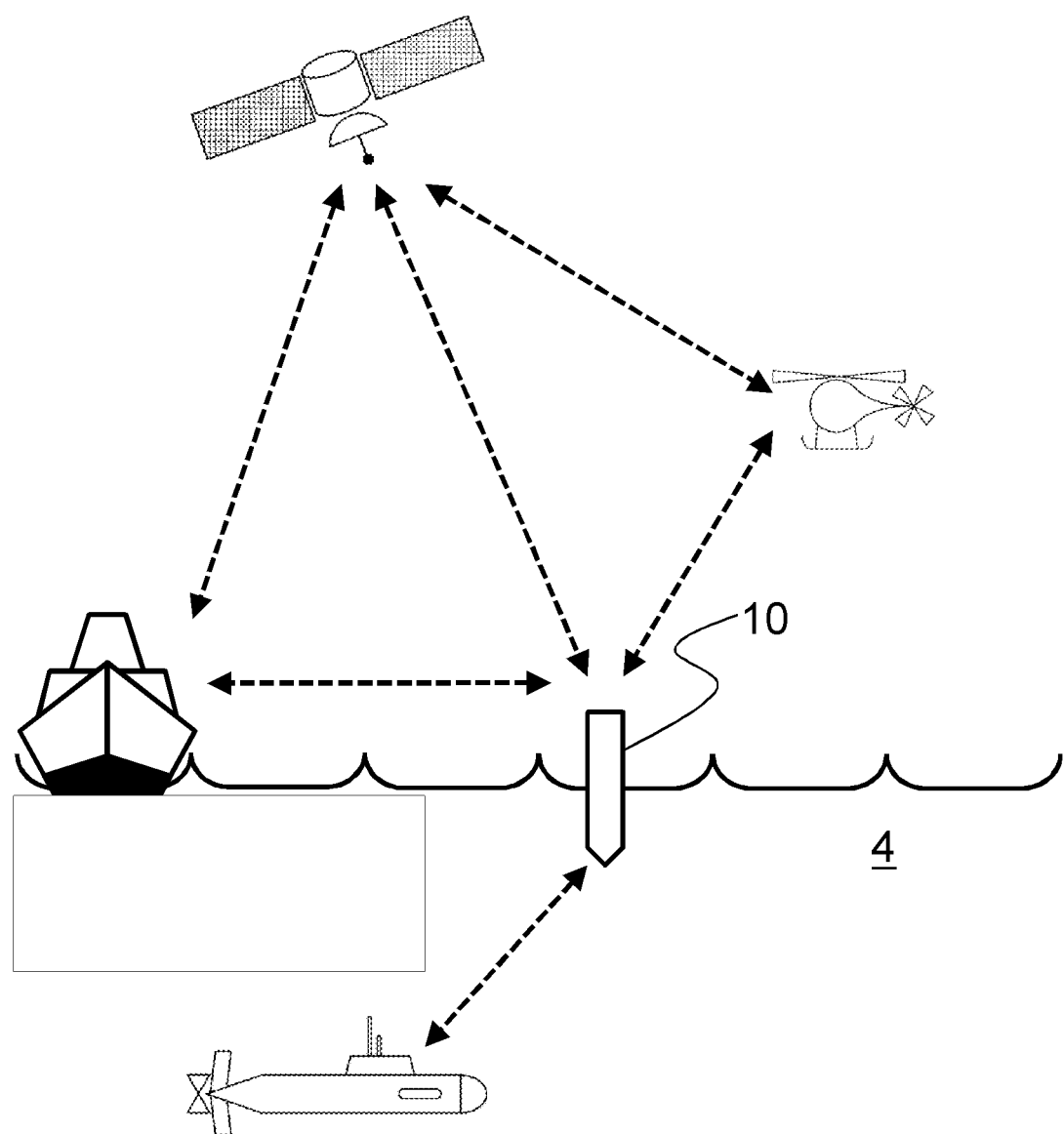

In the example shown in FIG. 16, the communication and reconnaissance assembly 10 is employed as a communications node between multiple platforms and vessels in different arenas, e.g. land, air, sea and underwater. The assembly 10 is launched into a region of water as described previously and is able to receive and transmit signals above and below the water. The assembly 10 is therefore able to breach the above/below water barrier that would typically prevent platforms or vessels in different arenas communication with each other.

The assembly as discussed may take the form of a single-body artillery shell fired from the barrel of a gun. However, the thick exterior of the shell, which is capable of withstanding explosive propulsion-based launch from a gun barrel and necessary to protect the communication and reconnaissance components, may compromise the effective communication and/or reconnaissance abilities of the assembly.

Therefore, in another example, the assembly comprises a carrier and a communication and reconnaissance payload (or sub-projectile). The communication and reconnaissance payload is the object for which controlled entry into, and functionality in, the water is achieved, whereas a carrier of the assembly is simply a tool to get the communication and reconnaissance sub-projectile to, or proximate to, a target location.

One of the main advantages is that the assembly as a whole, and particularly an outer carrier for carrying the payload or sub-projectile, can be well or better configured for launch from a gun, with the range and accuracy that such configurations brings. For example, the carrier can be bullet-shaped, ogive-shaped or roundly-shaped or tapering, in accordance with the typical shape of munitions. However, and at the same time, the communication and reconnaissance payload or sub-projectile can then have any desired shape, since the communication and reconnaissance payload does not need to be configured for being fired from a gun. This means that the communication and reconnaissance payload can then be more easily and readily configured for controlled descent toward and into the water, reducing or preventing damage that might otherwise occur if the communication and reconnaissance assembly was fired directly into the water.

Whereas expulsion of the communication and reconnaissance payload from its carrier could be achieved underwater, greater benefits are achieved by expulsion in the air, since delicate communication and reconnaissance components are then not subjected to the force of entry into the water from a natural ballistic, gun-launched, trajectory. Also, the communication and reconnaissance payload will be travelling more slowly than a 'conventional' munition, and therefore the water entry shock loading should be reduced, accordingly.

Figure 17:
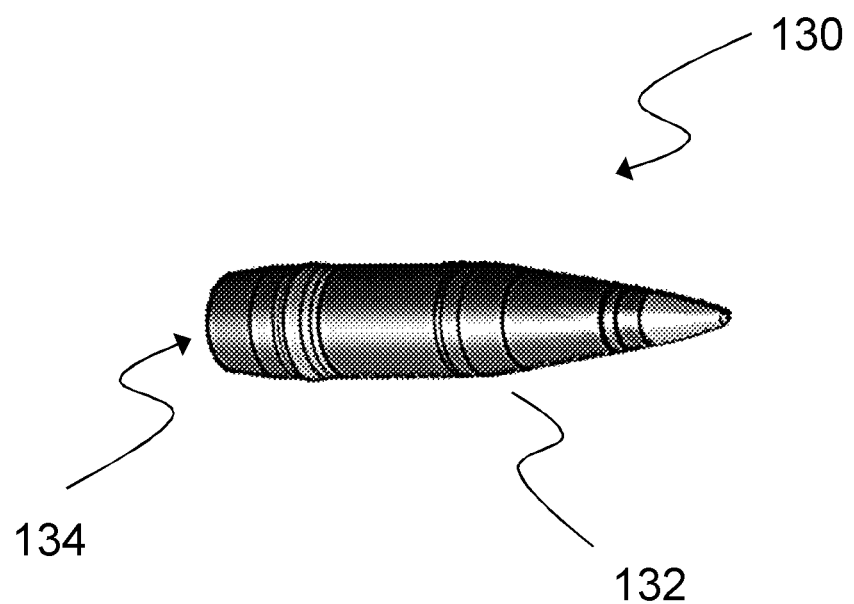

FIG. 17 shows a communication and reconnaissance assembly 130, arranged to be launched from a gun, much as with the communication and reconnaissance assembly of previous examples. The communication and reconnaissance assembly 130 comprises a carrier 132 for a communication and reconnaissance payload 134. A nose of the carrier 132 is ogive-shaped or roundly-shaped or tapering, for greater aerodynamic performance. The carrier 132 comprises (which includes defines) a cavity in which the payload 134 is located. The cavity retains and protects the payload 134, and so shields the payload 134 during launch and flight conditions of the communication and reconnaissance assembly 130.

The communication and reconnaissance assembly 130 may be launched and generally handled much as with the communication and reconnaissance assembly of earlier examples. However, in previous examples, controlled descent of the entire launched projectile, in the form of the (single-bodied) communication and reconnaissance assembly, is implemented. In the present examples, the communication and reconnaissance payload is expelled from its carrier, and controlled descent of the payload is implemented, in the same manner as with the communication and reconnaissance assembly of previous examples. Again, then, the advantage of the present examples is that communication and reconnaissance assembly can be tailored for launch and flight conditions, and the payload can be tailored for descent and communication and reconnaissance operations. The two-body approach allows for tailoring of a two-part problem.

Figure 18:
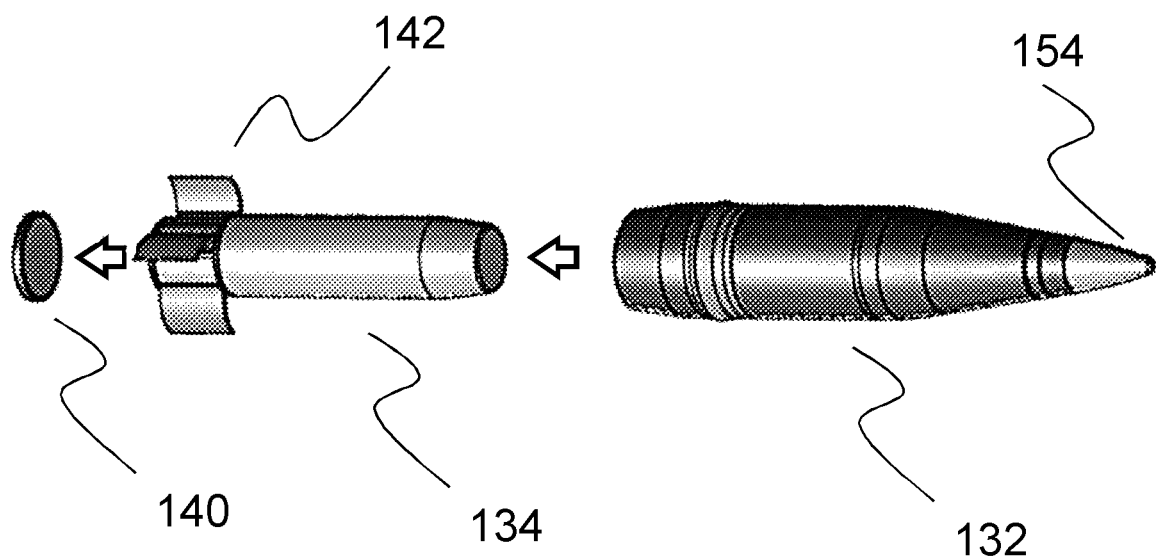
FIG. 18 shows an exploded view, and/or functionality, of the munition assembly of FIG. 17, in accordance with an example embodiment.

FIG. 18 shows that the communication and reconnaissance payload 134, initially carried by the carrier 132 in the cavity, is arranged to be controllably expelled from the carrier. This might be achieved by use of a fuze and an expulsion charge, for example a carrier fuze 154 and a carrier expulsion charge. The carrier fuze 154 may operate on a timer, triggering the carrier expulsion charge to expel the communication and reconnaissance payload at or proximate to a target location, for example above a location of a target. The carrier fuze may be programmed with a particular timing, or any other set of conditions, for example location-based activation, environmental sensing-based activation, and so on.

The communication and reconnaissance payload 134 is expelled via a rear end of the carrier 132. This is advantageous, as this might better ensure the maintenance of a predictable ballistic trajectory of the communication and reconnaissance payload 134 or carrier 132, or prevent the carrier 132 from impacting upon the payload 134. As above, it is the payload 134 for which slow, controlled descent is desirable, and so leaving the carrier 132 via a rear end allows for much more design and functional control, in implementing this.

The communication and reconnaissance payload may be arranged to be expelled from a rear end of the carrier via a closure 140. The closure might generally close or seal off the payload 134 within the carrier 132. This might be useful for handling or safety reasons, or assist in shielding the payload from launch and flight conditions. The closure 140 is arranged to be opened before or during expulsion of the payload 134. This could be an active opening, for example via a controlled electronic or pneumatic switch or opening mechanism. However, it is likely to be simpler for this opening to be relatively passive or responsive, in that the closure 140 is arranged to open, for example via a shearing action, due to pressure of the expulsion charge on the opening, either directly, or indirectly via contact with the payload 134 itself.

As with the communication and reconnaissance assembly of previous examples, the payload 134 comprises a deployable configuration 142 that is arranged, when deployed, to slow the payload 142 in the air, after expulsion from the carrier 132, and before entry to the water. The deployment could be active, for example based on sensing of air flow or payload release, and an electrical or mechanical system actively deploying the configuration 142. However, a more passive, automatic deployment may be simpler to implement, and more reliable. For example, FIG. 18 shows that wings or fins 142 might automatically deploy, to provide a degree of auto rotation to slow or further slow the munition 134 during its descent. The wings or fins 142 could be spring loaded, in a compressed or closed state, when in carrier 132, and then automatically un-compress or open when expulsion is implemented. Alternatively, the act of air flow during or after expulsion may force the wings or fins 142 to deploy.

Figure 19:
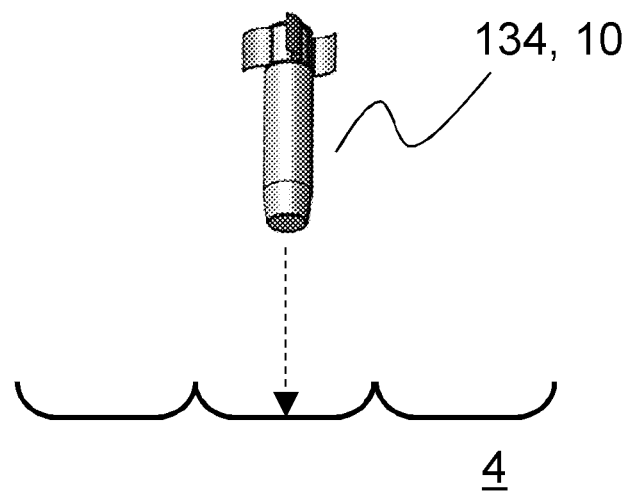
FIG. 19 shows a payload of the munition assembly of FIG. 17, being directed towards a body of water, in accordance with an example embodiment.

FIG. 19 shows that the communication and reconnaissance payload 134 functions largely as the assembly 10 of previous examples, descending toward and eventually onto or into the body of water 4, for communication and reconnaissance operations.

Figure 20:
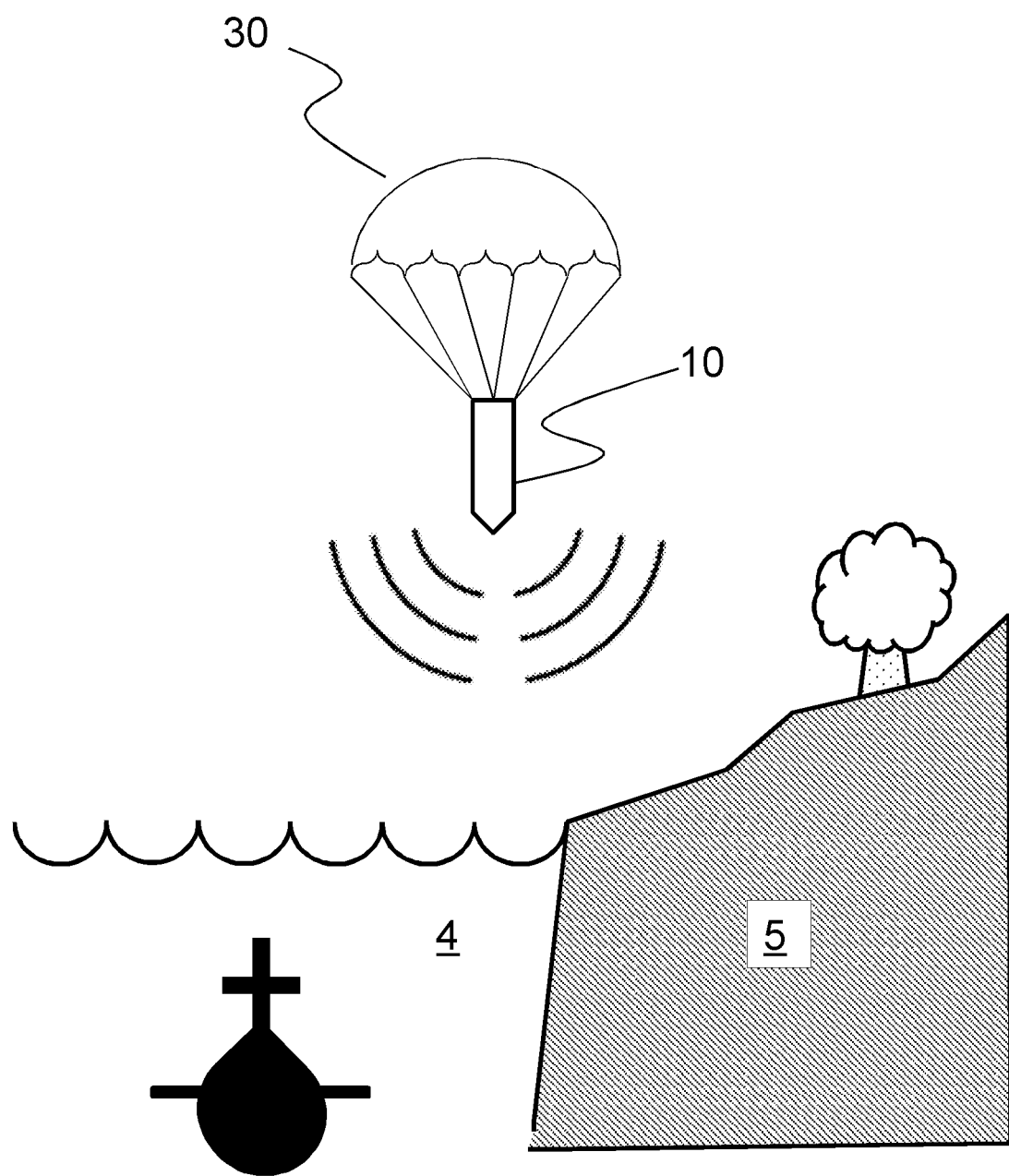
FIG. 20 schematically depicts a communication and reconnaissance assembly operating in the air in accordance with an example embodiment.

FIG. 20 shows an example communication and reconnaissance assembly 10 which has been fired from the barrel of a gun much in the manner as described previously. However, the assembly 10 may be fired over either water 4 and land 5. In this example, the assembly 10 comprises a transmitter which is adapted to operate whilst the assembly 10 is descending towards the water 4 or land 5. Therefore, in order to extend the effective operation time of the transmitter, a parachute 30 is deployed to slow the descent of the assembly 10 as much as possible. It may also be preferably to acquire the maximum height (as opposed to distance) when launching the assembly 10 from a gun. The transmitter is adapted to emit signals, including but not limited to electromagnetic pulses; electromagnetic decoy signals; and electromagnetic jamming signals. The assembly may therefore be employed to disable, disrupt or disorientate enemy units in the vicinity, or disguise the location and/or location of friendly platforms/vessels in the vicinity.

In a further example the communication and reconnaissance assembly 10 also comprises a receiver and is able to receive data and rely information external to and away from the assembly 10 e.g. back a friendly vessel, vehicle or platform. The receiver may be adapted to receive a range or signal types, including by not limited to: a magnetic signature; electromagnetic signals; electric field signatures; data transmission; and optical signals. Therefore the communication and reconnaissance assembly 10 can be employed as a remote sensor whilst it is descending to the water 4 or ground 5.

In another example (not shown) the communication and reconnaissance assembly 10 shown in FIG. 20 is adapted to be fired over land 5 and is provided with a deployable configuration, such as a parachute 30, that is arranged, when deployed at some time after launch, to slow the assembly 10 in the air before the assembly hits the ground. The assembly 10 is adapted to survive landing and operate as a communication and reconnaissance assembly whilst on the ground. This may be in addition to any communication and reconnaissance operations carried out in the descent as described above. For example, the landed assembly 10 may act as a communications node between forces out of range of normal communications means, or may be adapted to detect signals from enemy forces, and transmit information external to and away from the assembly e.g. back to an off-shore battleship 2, or to another communication node. The assembly may also be adapted to operate as a decoy, or jammer much as described before.

The assembly described in the examples above with regard to at least FIG. 20 may of course also be realised by an unmanned aerial vehicle instead of an assembly 10 with parachute 30, as discussed in more detail below. As shown in FIG. 21, in a further example of the carrier 132 and payload 134 arrangement, the communication and reconnaissance payload 134 comprises an unmanned aerial vehicle (UAV). The UAV is adapted to be expelled from the carrier 132 above water 4 (or land in other examples as discussed previously), and maintain flight above the surface whilst carrying out communication and reconnaissance operations. For example, the UAV 134 may comprise a number of sensors including but not limited to those adapted to detect at least one of: a magnetic signature; electromagnetic signals; electric field signatures; data transmission; and optical signals. The assembly is adapted to adapted to detect signals from enemy forces, for example the magnetic signature of a submerged submarine, and transmit information external to and away from the assembly e.g. back to an off-shore battleship 2, or to another communication node.

FIG. 22 shows a flowchart for an example method of deploying the communications and reconnaissance assemblies as discussed above. The method comprises launching (step 90) at least one communication and reconnaissance assembly as described above into the air towards a body of water, from a gun barrel. The gun may be situated on a mobile vessel (land, sea or air-based) or on a static platform. The communication and reconnaissance assembly comprises a carrier with a cavity for a communication and reconnaissance payload. The cavity retains and protects the payload, and so shields the payload during launch and flight conditions of the communication and reconnaissance assembly. The method also comprises expelling (step 92) the payload from the carrier of the communication and reconnaissance assembly, and the payload entering the water. The payload comprises a receiver and a transmitter, and the method comprises receiving (step 94), at the payload, a signal, and transmitting a signal away from the payload.

In another example, the method comprises the assembly (comprising a carrier and a payload) being fired into the air, expelling the payload from the carrier of the communication and reconnaissance assembly, and as the payload descends to the surface (of water or land) the payload receives a signal (whilst still in the air), and transmits a signal away from the payload.

In another example, the method comprises the assembly (comprising a carrier and a payload) being fired into the air over land, expelling the payload from the carrier of the communication and reconnaissance assembly, and the payload descending to ground and once the payload has landed, the payload receives a signal (whilst on the ground), and transmits a signal away from the payload.

FIG. 23 shows a flowchart for an example method of deploying the communications and reconnaissance assemblies as discussed above. The method comprises launching (step 91) at least one communication and reconnaissance assembly as described above into the air towards a body of water, from a gun barrel. The gun may be situated on a mobile vessel (land, sea or air-based) or on a static platform. The communication and reconnaissance assembly comprises a carrier with a cavity for a communication and reconnaissance payload. The cavity retains and protects the payload, and so shields the payload during launch and flight conditions of the communication and reconnaissance assembly. The method also comprises expelling (step 93) the payload from the carrier of the communication and reconnaissance assembly, and the payload entering the water. The payload comprises a transmitter, and the method comprises transmitting (step 95), a signal from the payload once the payload as entered the water. The signal could be a sonar/sound e for submarine location, and in other examples the transmitter may be adapted to emit other types of signals, including but not limited to electromagnetic pulses; electromagnetic decoy signals; and electromagnetic jamming signals. These assemblies can be used to disable, disrupt or disorientate enemy submarines, or disguise the location and/or location of friendly platforms/vessels in or below the water.

In another example, the method comprises the assembly (comprising a carrier and a payload) being fired into the air, expelling the payload from the carrier of the communication and reconnaissance assembly, and as the payload descends to the surface (of water or land) the payload transmits a signal (whilst still in the air) from the payload.

In another example, the method comprises the assembly (comprising a carrier and a payload) being fired into the air over land, expelling the payload from the carrier of the communication and reconnaissance assembly, and the payload descending to ground and once the payload has landed, the payload receives a signal (whilst on the ground), and transmits a signal away from the payload.

The signals transmitted by the assembly payload in the examples above include but are not limited to electromagnetic pulses; electromagnetic decoy signals; and electromagnetic jamming signals. The assembly may therefore be employed to disable, disrupt or disorientate enemy units in the vicinity, or disguise the location and/or location of friendly platforms/vessels in the vicinity.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A reconnaissance and communication assembly, adapted to be launched from a gun barrel into the air, the assembly comprising:
   a carrier; and
   a payload;
   wherein
      the carrier comprises a cavity in which the payload is located,
      the payload is arranged to be controllably expelled from the carrier after the carrier has been launched from the gun barrel into the air,
      the payload comprises at least one transmitter operable after the payload has been expelled from the carrier such that the payload is separated entirely from the carrier, and
   the at least one transmitter is configured to emit an electromagnetic jamming signal.

2. The assembly according to claim 1, comprising at least one receiver adapted to detect/receive one of:
   a magnetic signature;
   an electromagnetic signal;
   a sonar/acoustic signal;
   an electric field signature;
   data transmission; and
   an optical signal;
   wherein the at least one receiver is operable after the payload has been expelled from the from the carrier.

3. The assembly according to claim 2, wherein the at least one transmitter is operable to transmit data based on the detected/received signature and/or signal.

4. The assembly according to claim 1, wherein the electromagnetic jamming signal is disruptive to submarine communication.

5. The assembly according to claim 1, wherein the payload comprises a deployable configuration that is arranged, when deployed, to slow the payload in the air, after expulsion from the carrier.

6. The assembly according to claim 5, wherein the deployable configuration includes:
   a parachute; and/or
   one or more wings or fins, to provide rotation.

7. The assembly according to claim 6, wherein the one or more wings or fins are controllable to provide directional control of said payload.

8. The assembly according to claim 1, wherein the payload comprises an unmanned aerial vehicle (UAV).

9. The assembly according to claim 1, wherein the carrier comprises:
   a carrier expulsion charge; and
   a carrier fuze adapted to trigger the carrier expulsion charge to controllably expel the payload from the carrier.

10. The assembly according to claim 1, wherein the payload is arranged to be expelled from a rear end of the carrier.

11. The assembly according to claim 1, wherein:
   the assembly is arranged to be launched from a smooth bore and, optionally, the assembly is fin-stabilised; or
   the assembly is arranged to be launched from a rifled bore.

12. A system, comprising:
   a gun, comprising a gun barrel; and the assembly according to claim 1, wherein the assembly is adapted to be launched, into the air, from the gun barrel.

13. A method of launching a payload, the method comprising:
expelling, after launching the communication and reconnaissance assembly according to claim 1 into the air from a gun barrel, the payload from the carrier of the communication and reconnaissance assembly; and
emitting/transmitting a signal away from the payload.

14. The method according to claim 13, wherein the signal is emitted as the payload descends in the air.

15. The method according to claim 13, wherein the signal is emitted after the payload has landed on the ground or enters water.

16. The assembly according to claim 5, wherein the deployable configuration is arranged to deploy automatically after the payload has been expelled from the carrier.

17. The assembly according to claim 6, wherein the one or more wings or fins are controllable to provide directional control of said payload, via a moveable control surface.

18. The assembly according to claim 1, wherein the payload is arranged to be expelled from a rear end of the carrier, via a closure that is arranged to be opened before or during expulsion of the payload.

19. A reconnaissance and communication assembly, adapted to be launched from a gun barrel into the air, the assembly comprising:
a carrier including a cavity;
a payload in the cavity and arranged to be controllably expelled from the carrier, the payload including an electromagnetic jamming device operable after the payload has been expelled from the carrier; and
a deployable configuration arranged to automatically deploy, and when deployed, to slow the payload in the air, after expulsion from the carrier, the automatic deployment being actively achieved by a sensor and/or an electrical system.

20. A reconnaissance and communication assembly, adapted to be launched from a gun barrel into the air, the assembly comprising:
a carrier including a cavity;
a payload in the cavity and arranged to be controllably expelled from the carrier after the carrier has been launched from the gun barrel into the air, the payload including an electromagnetic jamming device operable after the payload has been expelled from the carrier such that the payload is separated entirely from the carrier; and
a deployable configuration arranged to automatically deploy, and when deployed, to slow the payload in the air, after expulsion from the carrier, the automatic deployment being passively achieved by a spring, a mechanical system, and/or air flow.

* * * * *